(12) United States Patent
Kikuchi et al.

(10) Patent No.: US 7,769,257 B2
(45) Date of Patent: Aug. 3, 2010

(54) OPTICAL TRANSMISSION SYSTEM AND SIGNAL SPEED CONVERTING APPARATUS

(75) Inventors: Nobuhiko Kikuchi, Tokyo (JP); Takao Fukushima, Funabashi (JP); Naohiro Sakakida, Tokyo (JP); Hiroyuki Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 152 days.

(21) Appl. No.: 12/196,424

(22) Filed: Aug. 22, 2008

(65) Prior Publication Data
US 2009/0116839 A1    May 7, 2009

(30) Foreign Application Priority Data
Aug. 24, 2007  (JP) .............................. 2007-218704

(51) Int. Cl.
G02B 6/28 (2006.01)
(52) U.S. Cl. .............................. 385/24; 385/15; 385/147
(58) Field of Classification Search .................. 385/15, 385/24, 147
See application file for complete search history.

(56) References Cited

U.S. PATENT DOCUMENTS 5,689,501 A * 11/1997 Takase et al. ............... 370/244
6,532,320 B1   3/2003 Kikuchi et al.
2007/0194915 A1 * 8/2007 Chun ......................... 340/541

FOREIGN PATENT DOCUMENTS

JP     2001-230759     8/2001
WO    WO 98/42095     9/1998

* cited by examiner

Primary Examiner—Jennifer Doan
(74) Attorney, Agent, or Firm—Antonelli, Terry, Stout & Kraus, LLP.

(57) ABSTRACT

A signal speed converting apparatus to be connected to a WDM transmission end office, comprising a first interface connected to a first optical line group, a plurality of second interfaces connected to a second optical line group, and a speed converter. The first interface has a first framer for terminating a frame in a first format received from the first optical line group and outputting an information signal extracted from the received frames as a serial signal train or parallel signal trains. The speed converter converts the output signal from the first framer into transmission signal trains each including interleaved communication frame by cyclically distributing the output signal from the first framer to a plurality of internal lines. Each of the second interfaces has a second framer for converting the communication frame received from one of the internal lines into information frame in a second format to be transmitted to the second optical line group. Management information inserting units are located between the first and second interfaces in order to insert management information to be communicated with an opposite apparatus into the transmission signal trains on the internal lines.

22 Claims, 19 Drawing Sheets

OUTPUT OF FIRST FRAMER CIRCUIT

OUTPUT OF SPEED CONVERTER

OUTPUT OF SECOND FRAMER CIRCUIT

OUTPUT OF DELAY BUFFER

OUTPUT OF THIRD FRAMER CIRCUIT

OUTPUT OF PARITY CALCULATOR

OUTPUT OF SPEED CONVERTER

APRIOR ART

APRIOR ART

OPTICAL TRANSMISSION SYSTEM AND SIGNAL SPEED CONVERTING APPARATUS

CLAIM OF PRIORITY

The present application claims priority from Japanese patent application serial No. 2007-218704, filed on Aug. 24, 2007, the content of which is hereby incorporated by reference into this application.

BACKGROUND OF THE INVENTION (1) Field of the Invention

The present invention relates to an optical transmission system and a signal speed converting apparatus, and more specifically to an optical information transmission system for transmitting and receiving communication frames via an optical fiber transmission line and a signal speed converting apparatus to be used therefore.

(2) Description of the Related Art

In information devices, such as a large-capacity router, a storage server, a high speed optical line concentrator, or the like, or a communication node device, an optical interface speed for transmitting information included in each device is rapidly increasing from 1 Gbps to 10 Gbps and from 10 Gbps to 40 Gbps with the increase of information load to be treated. The reason is that using a high speed optical interface can reduce a mounting volume of the apparatuses or power consumption thereof as well as the number of optical lines connecting between the apparatuses to save installation costs of the lines or rental costs thereof, as compared to using a plurality of low speed optical interfaces.

If a range between the information devices is short, it is able to interconnect the apparatuses through an optical interface for short-range transmission wherein maximum transmission range is about 10 km. However, for example, when interconnecting the information devices distributed within a city (within a range of about 100 km) or between cities (about 100 km or more), they should pass through a wavelength division multiplexing (WDM) optical transmission network, such as a metropolitan network or a trunk line network, etc.

These kinds of information devices are provided with short-range optical interfaces, such as, for example, SONET/SDH, OTN, Ethernet LAN-PHY/WAN-PHY, etc., as connection interfaces to the WDM optical transmission network. A transmitting-side information device uses one of the interfaces to transmit an information signal as an optical signal in a short-range transmission format to the WDM optical transmission network. The optical signal transmitted from the information device is converted into an optical signal (for example, an optical signal of 1.5 μm band) for long-range transmission having a predetermined speed by WDM transmission equipment (for example, add drop multiplexer (ADM)) belonging to a communication carrier. The optical signal thus converted is wavelength-multiplexed with optical signals transmitted from other information devices and transmitted over an long-range optical section. The WDM optical signal transmitted over the long-range optical section is converted back into the optical signal in the short-range transmission format by receiving-side WDM transmission equipment and transmitted to an opposite-side information device.

Until now, a modulation speed of the optical interface for long-range transmission is also being increased to 2.5 Gbps, 10 Gbps, and 40 Gbps as the speed of the optical interface for short-range transmission is increased. In the WDM optical transmission network section, however, if the line speed is increased, the wavelength dispersion within the optical path is affected so that it becomes difficult to perform the long-range transmission of the optical signal.

To be concrete, if the modulation speed of the optical signal is increased, waveform distortion is increased by the wavelength dispersion so that the signal transmission range is reduced in inverse proportion to a square of bit rate. For this reason, the maximum transmission range is reduced with the increase of the transmission speed. For example, the maximum transmission range is 600 to 1200 km in 2.5 Gbps, it is reduced to several tens km in 10 Gbps, and it is reduced only to several km in 40 Gbps. Therefore, if the modulation speed of the optical interface for long-range transmission becomes high, the number of relay devices required between WDM transmission end offices is increased, thereby greatly raising costs.

A mismatch between the transmission speed of the optical interface for short-range transmission in each information device and the modulation speed of the WDM optical transmission network forming the long-range transmission section may also cause serious problems afterward. Since the transmission speed of the interface for short-range transmission, such as, for example, 10 Giga Ethernet, 40 Giga Ethernet, 100 Giga Ethernet, etc., can relatively easily be increased, it can be expected to rapidly progress the development of the high speed interface.

However, since the WDM transmission section has problems in the reliability of the optical line or in the increased cost due to the restriction of the aforementioned transmission range, the modulation speed of the interface for long-range transmission cannot be changed simply. For this reason, the optical line of 10 Gbps to 2.5 Gbps is mainly used up to now and the introduction of the high speed line of 40 Gbps is rare worldwide. Even if the 100 Giga Ethernet is adopted as a next-generation interface for short range transmission in future, when the channel speed of the WDM optical transmission equipment is 40 Gbps or less, there may be a risk of hindering the signal transmission among the long-range information devices within a city or between cities.

As related arts concerning the above-mentioned problems, for example, a WDM optical communication system using a wavelength demultiplexing optical transponder is disclosed in Japanese Patent publication No. 2001-230759 and WO/1998/042095.

FIG. 7 shows an example of an optical network in the related art using the wavelength demultiplexing optical transponder. In FIG. 7, a signal transmission system from a first office 182-1 to a second office 182-2 is shown.

The first office 182-1 includes a transmitting-side WDM transmission end office 183 to which routers 150-1 to 150-3 are connected via intra-office optical lines 187-1 to 187-3. The second office 182-2 includes a receiving-side WDM transmission end office 184 to which routers 150-4 to 150-6 are connected via intra-office optical lines 187-4 to 187-6.

The transmitting-side WDM transmission end office 183 comprises a wavelength demultiplexing transponder 180, transponders 185-1 and 185-2, and an optical wavelength multiplexer 146 for wavelength-multiplexing optical signals having different wavelengths (wavelengths λ1 to λ6) output from these transponders and transmitting them to a trunk line WDM optical path 142. On the other hand, the receiving-side WDM transmission end office 184 comprises an optical wavelength demultiplexer 144 for demultiplexing WDM optical signals received from the trunk line WDM optical path 142 into optical signals per wavelength, a wavelength demultiplexing transponder 181 connected to the optical wavelength demultiplexer 144, and transponders 186-1 and 186-2.

The router 150-1 sends out transmission signals modulated, for example, at a high speed of 40 Gbps or 100 Gbps to the intra-office optical line 187-1. The transmission signals are subjected to a wavelength conversion and a format conversion into inter-office transmission signals by the wavelength demultiplexing transponder 180 and thereafter demultiplexed into low-speed optical signals with four wavelengths $\lambda 1$ to $\lambda 4$, thereby to input to the optical wavelength multiplexer 146. Transmission signals from the router 150-2 and 150-3 are input to the transponders 185-1 and 185-2 via the intra-office optical lines 187-2 and 187-3 and input to the optical wavelength multiplexer 146 as the low-speed optical signals with wavelengths $\lambda 5$ to $\lambda 6$, respectively. The optical wavelength multiplexer 146 wavelength-multiplexes the optical signals with the wavelengths $\lambda 1$ to $\lambda 6$ and send outs the wavelength-multiplexed signals to the trunk line WDM optical path 142.

In the receiving-side WDM transmission end office 184, the WDM optical signals received from the trunk line WDM optical path 142 are demultiplexed into optical signals per wavelength by the optical wavelength demultiplexer 144. The four optical signal trains with the wavelengths $\lambda 1$ to $\lambda 4$ are input to the wavelength demultiplexing transponder 181 to absorb an inter-wavelength delay difference occurred on the optical path 142 and to convert into an original multiplexed optical signal. The multiplexed optical signal is output to the router 150-4 via the intra-office optical line 187-4. The optical signal with $\lambda 5$ and the optical signal with $\lambda 6$ output from the optical wavelength demultiplexer 144 are wavelength-converted by the transponders 186-1 and 186-2 and input to the routers 150-5 and 150-6 via the intra-office optical lines 187-5 and 187-6, respectively.

Although FIG. 7 shows the information transmission system from the first office 182-1 to the second office 182-2, each of the offices 182-1 and 182-2 generally includes both the transmitting-side WDM transmission end office 183 and the receiving-side WDM transmission end office 184 so as to enable the information transmission from the second office 182-2 to the first office 182-1.

FIG. 8 shows a configuration view of the wavelength demultiplexing optical transponder in the related art. In FIG. 8, one wavelength demultiplexing optical transponder 196 is constituted by a combination of the transmitting-side wavelength demultiplexing transponder 180 and the receiving-side wavelength demultiplexing transponder 181 shown in FIG. 7.

The optical signal (wavelength $\lambda a=1.3 \mu m$, etc.) input from the intra-office optical fiber 187-1 is converted into an electrical signal by an optical receiver 191 and demultiplexed into N (four in FIG. 8) low-speed transmission signals by a demultiplexer 193. These transmission signals are generally transmitted as parallel signals in an electric circuit. The number N of low-speed signals in the specification means the number of logical signal lines.

The N demultiplexed transmission signals are input to optical transmitters 194-1 to 194-4 respectively, converted into optical signals each having a format for inter-office transmission, and transmitted from the optical transmitters as optical signals having different wavelengths ($\lambda 1$ to $\lambda 4$) to output optical fibers 188-1 to 188-4 connected to the optical multiplexer.

The optical signals having the wavelengths $\lambda 1$ to $\lambda 4$ received from optical fibers 189-1 to 189-4 connected to the receiving-side wavelength demultiplexing transponder 181 are input to optical receivers 195-1 to 195-4 respectively to convert into electrical signals and compensate for the inter-signal delay difference occurred in the trunk line optical path. The output signals from the optical receivers 195-1 to 195-4 are multiplexed by a multiplexer 192 and input as an electrical signal train to the optical transmitter 190. The optical transmitter 190 converts the input electrical signal train into a high-speed optical signal with a wavelength $\lambda b$ and transmits the high-speed optical signal to the intra-office optical fiber 187-4.

In order to solve the aforementioned problems, the wavelength demultiplexing transponder according to the prior art time-demultiplexes (interleaves) the high-speed optical signals to divide them into a plurality of low-speed optical signals with different wavelengths from each other so that wavelength-multiplexed signals are transmitted from the inter-office side optical transmitter, like the operation of the aforementioned transmitting-side wavelength demultiplexing transponder 180.

SUMMARY OF THE INVENTION

The wavelength demultiplexing transponder mitigates the restriction of the signal transmission range by time-demultiplexing (interleaving) the high-speed serial optical signals for short range transmission into relatively low-speed wavelength multiplexing signals. However, there are following problems to be solved in real applications.

The first problem resides in low generality of hardware in the wavelength demultiplexing transponder. As shown in FIG. 8, the wavelength demultiplexing transponder in the prior art includes a plurality of optical transmitters 194 and a plurality of optical receivers 195 for inter-office long-distance transmission. In order to use the maximum transmission performance of the WDM transmission end office 183, the inter-office side optical transmitter and receiver need to have the same bit rate, same format, and same transmission performance (for example, reception sensitivity or wavelength dispersion tolerance) as the inter-office interface provided in the other transponders 185 and 186. However, when the wavelength demultiplexing transponder is combined with WDM transmission equipment of other companies, the normal transmission of the optical signals between the offices cannot be assured because their performances are different from each other and responsibility may be unclear if any transmission failure occurs between the offices.

When the wavelength demultiplexing transponder is manufactured as a dedicated component for the WDM transmission equipment in order to avoid such problem, the generality of the wavelength demultiplexing transponder is remarkably degraded. In the inter-office interface, for example, the combinations of the optical signal formats (OTN, SDH, SONET, Ethernet), the signal modulation schemes (NRZ modulation/RZ modulation, intensity modulation/phase modulation/duobinary modulation, existence or non-existence of frequency chirp, etc.), request specifications (output intensity, wavelength precision, C band/L band, wavelength tunable range), or the like are very various, which is one factor of the degradation of the generality. If the generality is degraded, the manufacturing cost of the inter-office interface is raised because cost down effect of the mass production is lost.

The second problem resides in the difficulty in operating the wavelength demultiplexing transponder flexibly, independent of the WDM transmission equipment. For example, the office side output optical wavelengths ($\lambda 1$ to $\lambda 4$) of the wavelength demultiplexing transponder 180 should be met with the wavelengths in an unused status in the WDM transmission end offices 183 and 184 or the trunk line WDM optical path 142. To this end, for example, it is necessary to obtain the wavelengths to be used in the inter-office side optical transmitters 194-1 to 194-4 from a supplier of the wavelength demultiplexing transponder before manufacturing the wavelength demultiplexing transponder or it is necessary to provide a variable wavelength light source as a light source for the inter-office side optical transmitter and to set the output wavelength at the installation site of the wavelength demultiplexing transponder according to the unused wavelength notified from the WDM transmission end office.

In the case where there is no transmission system of inherent management information for the wavelength demultiplexing transponder, it is necessary to use a monitor information transmission system provided in the WDM transmission end office upon starting the equipment or during the failure monitoring operation of the equipment. In this case, the wavelength demultiplexing transponder has to transmit and receive the management information in association with the WDM transmission end office.

Generally, the wavelength demultiplexing transponder belongs to a transmission carrier having the WDM transmission end office at present. Accordingly, it is not suitable as a business model for an owner of an information apparatus, such as a router or a storage server, etc. to independently operate the wavelength demultiplexing transponder, or for a third transmission carrier other than the owner of the WDM transmission end office to provide a high speed transmission solution by possessing the wavelength demultiplexing transponder.

The third problem resides in the management of the wavelength demultiplexing transponder. The wavelength demultiplexing transponder has to be used together with the same kind of transponder located as an opposite apparatus at the other end of the inter-office optical path so as to configure a network capable of transmitting and receiving optical signals at groups of the same wavelengths (for example, $\lambda 1$ to $\lambda 4$). However, if there is no function of communicating the management information between the two transponders facing each other, it is difficult to check whether a connection between transponders is correct or to monitor line failure.

The communication of the management information between the transponders can be realized, for example, by using the transmission function of the management information provided in the aforementioned WDM transmission end office or by installing a dedicated line. In the latter case, however, the necessity of separate line in addition to a main signal transmission line becomes a disadvantage in the cost and system operation. As a simple method, for example, the management information may be written in an overhead portion of a high speed signal transmitted from the transponder so that the opposite apparatus extracts the management information from the received overhead portion. In this method, however, if failure occurs in any ones of the groups of wavelengths ($\lambda 1$ to $\lambda 4$) used for the parallel transmission of transmission signals, the receiving side fails to reproduce the entire transmission information including the overhead portion. As a result of occurrence of failure, this method fails in communication of the monitor information. When the inter-office communication is performed using a signal format having an undefined frame period, such as an Ethernet LAN-PHY, a problem also occurs that the existing communication interface does not have the transmission function of the management information.

The fourth problem relates to a redundancy line, such as a parity line. In the prior art parallel transmission of short-range optical signals, one or two channels of parity lines are added to a plurality of data transmission lines (for example, 10 channels) in order to simultaneously transmit data and parity codes. It is because the parallel optical transmission system needs as many transceivers as the number of channels and the failure rate thereof increases with the increase of the number of the transceivers. Redundancy information, such the parity code, etc., transmitted over the redundancy line can be generated from the transmission data by a simple operation. If the redundancy information is transmitted, even when the data in any channels is lost, the lost data can simply be recovered by calculating an Exclusive-OR with the data received from the remaining lines.

In the operation of the wavelength demultiplexing transponder, a portion where reliability is especially important is an inter-office WDM transmission section where the transmission information is transmitted in parallel. However, when a parity code automatically generated by the transponder is transmitted as an optical signal in the WDM transmission section, a signal format such as SONET, OTN, Ethernet PHY, etc. defined between the offices is lost. In this case, since the parity line cannot use a general-purpose inter-office optical interface or framer, relaying transmission by the general transponder becomes impossible.

In order to solve the aforementioned problems, the signal speed converting apparatus according to the present invention comprises: a first optical interface connected to a first optical line group that transmit information frames as a serial optical signal or a logical group of parallel optical signals; a plurality of second optical interfaces connected to a second optical line group that transmit the information frames as serial optical signals; and a speed converting unit located between the first optical interface and the second optical interfaces. The first optical interface has a first framer for terminating information frame in a first format received from the first optical line group and outputting a serial signal train or a logical group of parallel signal trains including original information signals extracted from the information frame. The speed converting unit converts the serial signal train or the parallel signal trains output from the first framer into a plurality of transmission signal trains each including interleaved original information signals, by cyclically distributing the serial signal train or the parallel signal trains to a plurality of internal lines in an upward direction corresponding to the second optical interfaces. Each of the second optical interfaces has a second framer that converts the interleaved original information signal received from the corresponding internal line in the upward direction into an information frame in a second format and transmits a transmission signal train including the information frame in the second format to one of optical lines of the second optical line group. Between the first optical interface and the second optical interfaces, management information inserting and extracting means is provided for inserting or extracting management information to be communicated with an opposite signal speed converting apparatus, which is located on the opposite side via an external WDM optical path, into or from the transmission signal trains on the respective internal lines.

The term "terminate" used in the specification means providing the management information, such as header, etc. to the input data signal on the transmitting side and separating the management information from the data signal and processing the management information on the receiving side.

The management information inserting and extracting means is comprised of a plurality of third framers provided for each internal line between the speed converting unit and each of the second optical interfaces. Each of the third framers inserts information supplied from a monitor unit of the signal speed converting apparatus as the management information into the transmission signal train on each internal line.

In the first embodiment of the present invention, the speed converting unit interleaves the original information signal so as to form an inter-frame gap in the transmission signal trains on each of the internal lines, and each of the third framers inserts and extracts the management information into and from the inter-frame gap included in the transmission signal train on the internal line in a non-interleave form.

In actual applications, the second optical line group is connected to a WDM transmission end office so that the interleaved original information signals transmitted from the plurality of second optical interfaces to the second optical line group and the optical signal including the non-interleaved management information are wavelength-multiplexed by the WDM transmission end office and the WDM optical signal is transmitted to an inter-office optical path. The WDM optical signal transmitted through the inter-office optical path is received by the opposite apparatus (signal speed converting apparatus) connected to the inter-office optical path in the same form as the transmitting-side signal speed converting apparatus.

A plurality of second optical interfaces in the opposite apparatus transmit the optical signals received from the second optical line group to the third framer and the speed converting unit via a plurality of internal lines in a downward direction. Each of the third framers extracts the management information from the receive signal on the internal line in a downward direction and transmits the management information to the monitor unit of the opposite apparatus. The speed converting unit extracts the interleaved information signals from the receive signals on each of the internal lines to recover the original information signal. The recovered information signal is converted into the signal speed of the first optical line group and sent out as the serial optical signal or a group of the parallel optical signals to the first optical line group via the first optical interface.

The management information may be transmitted to the opposite apparatus by using an unused area in a payload portion of each of the interleaved information signals, or a header portion of the information frame in the second format to be transmitted from the second framer.

In the former case, the speed converting apparatus is provided with a management information inserting and extracting unit so that the speed converting apparatus inserts the management information provided from the monitor unit into each of the interleaved information signals on the plurality of internal lines in an upward direction in a non-interleaved manner and extracts management information from each of the information signals received from the plurality of internal lines in a downward direction to transmit the extracted information to the monitor unit. In the latter case, each of the second framers is provided with a management information inserting and extracting unit so that the second framer inserts the management information supplied from the monitor unit into the header portion of the information frame of the second format in the non-interleaved manner and extracts management information from the header portion in the second format received from the second optical line group to transmit the extracted information to the monitor unit.

With the aforementioned configuration, the signal speed converting apparatus of the present invention can communicate the management information with the opposite apparatus. The management information may include, as common management information for the plurality of internal lines, status information on the transmitting-side signal speed converting apparatus, a control command to the opposite apparatus, an alarm or a response and includes line identification information as inherent information for each of the internal lines. The status information on the signal speed converting apparatus includes, for example, status information on the first and second optical interfaces.

In the exemplary embodiment of the present invention, the signal speed converting apparatus includes a parity calculator for generating a parity frame including a parity code train based on a group of the interleaved original information signals output from the speed converting unit to the plurality of internal lines in the upward direction and outputting the transmission signal train including the parity frame to a parity line which is one of internal lines in the upward direction, and the management information inserting and extracting unit inserts the management information into also the transmission signal train on the parity line. The parity frame is converted into the information frame in the second format by the second framer provided in the second optical interface connected to the parity line and transmitted to one of optical lines of second optical line group.

In the signal speed converting apparatus of the present invention, when the original information signal is framed, the speed converting unit interleaves each communication frame output from the first frame to the plurality of internal lines in an upward direction in such a manner that the specific interface among the plurality of second optical interfaces can send out a leading portion of the frame of the original information signal at any time. The speed converting unit interleaves each communication frame output from the first framer to the plurality of internal lines in an upward direction in such a manner that each leading portion of a header portion, a data portion, and a trailer portion in the plurality of interleaved communication frames can occupy positions temporally corresponding to each other on the plurality of internal lines in an upward direction.

The signal speed converting apparatus of the present invention allows the management information inserting unit to add a non-interleaved encapsulation header to the interleaved original information signal and the non-interleaved management information included in each of the transmission signal train.

As a modification example of the encapsulation, for example, the speed converting unit may add a non-interleaved encapsulation header to each of the interleaved original information signals, and the third framer adds a non-interleaved encapsulation header to the management information. The speed converting unit may extract the header portion from the framed original information signal received from the first framer, interleave the remaining portion to the plurality of internal lines in the upward direction, and add the header portion of the framed original information signal as the encapsulation header to each of the interleaved communication frames. Further, the speed converting unit may extract the header portion from each of the framed original information signals received from the first frame, supply the header portion to each of the third framer, and interleave the remaining portion of each of the framed original information signals to the plurality of internal lines in the upward direction. In this case, each of the third framers encapsulates the interleaved communication frame on each of the internal line by applying the header portion received from the speed converting unit. Each of the third frames may add a non-interleaved encapsulation header including the management information to the interleaved original information signal.

The signal speed converting apparatus of the present invention may be configured in such a manner that a plurality of first optical interfaces are connected to the speed converting unit so that the speed converting unit can multiplex the signal trains output from the plurality of first optical interfaces and interleave them to a plurality of internal lines.

The signal speed converting apparatus of the present invention may include plural groups of first optical interfaces and plural groups of second optical interfaces so as to realize a protection function for switching a working optical interface to a standby optical interface when failure occurs in the working optical interface.

The signal speed converting apparatus of the present invention may previously setup internal paths so that a group of the optical signals transmitted in parallel from the plurality of second optical interfaces are wavelength-multiplexed by the WDM transmission end office and sent out to the same optical path (or to the path where skew is a certain amount or less) in order to limit delay time difference occurred during the WDM signal is passing through the inter-office optical path within a controllable range by using a delay control buffer at receiving-side.

The signal speed converting apparatus of the present invention is offered independently from the WDM transmission end office so that it can be connected to the WDM transmission end office through low-speed optical lines, such as the Ethernet LAN-PHY or the SONET lines for short-range. Accordingly, the signal speed converting apparatus is not necessary to mount inter-office optical interfaces having high wavelength dependency, making it possible to drastically reduce costs.

Further, since the signal speed converting apparatus of the present invention is provided with an individual management information inserting unit to communicate management information with the opposite apparatus, it is possible to select a stand-alone operation mode by logically separating from the WDM transmission end office. According to the present invention, since the transmitting-side signal speed converting apparatus inserts the common management information in the non-interleaved manner to a plurality of signal trains for transmitting interleaved original information signals in parallel, if the receiving-side signal speed converting apparatus can receive the management information in any signal trains normally, the receiving side can recognize the status of the opposite apparatus and the line status, making it possible to communicate control commands between the signal speed converting apparatuses.

Further, according to the signal speed converting apparatus of the present invention, the transmission signal train on the parity line can be relayed on the WDM optical network in the same way as the transmission signal trains including the interleaved original information signals on the other lines, making it possible to facilitate the line management.

DETAILED DESCRIPTION OF THE PREFERRED EMBODIMENTS

Figure 1:
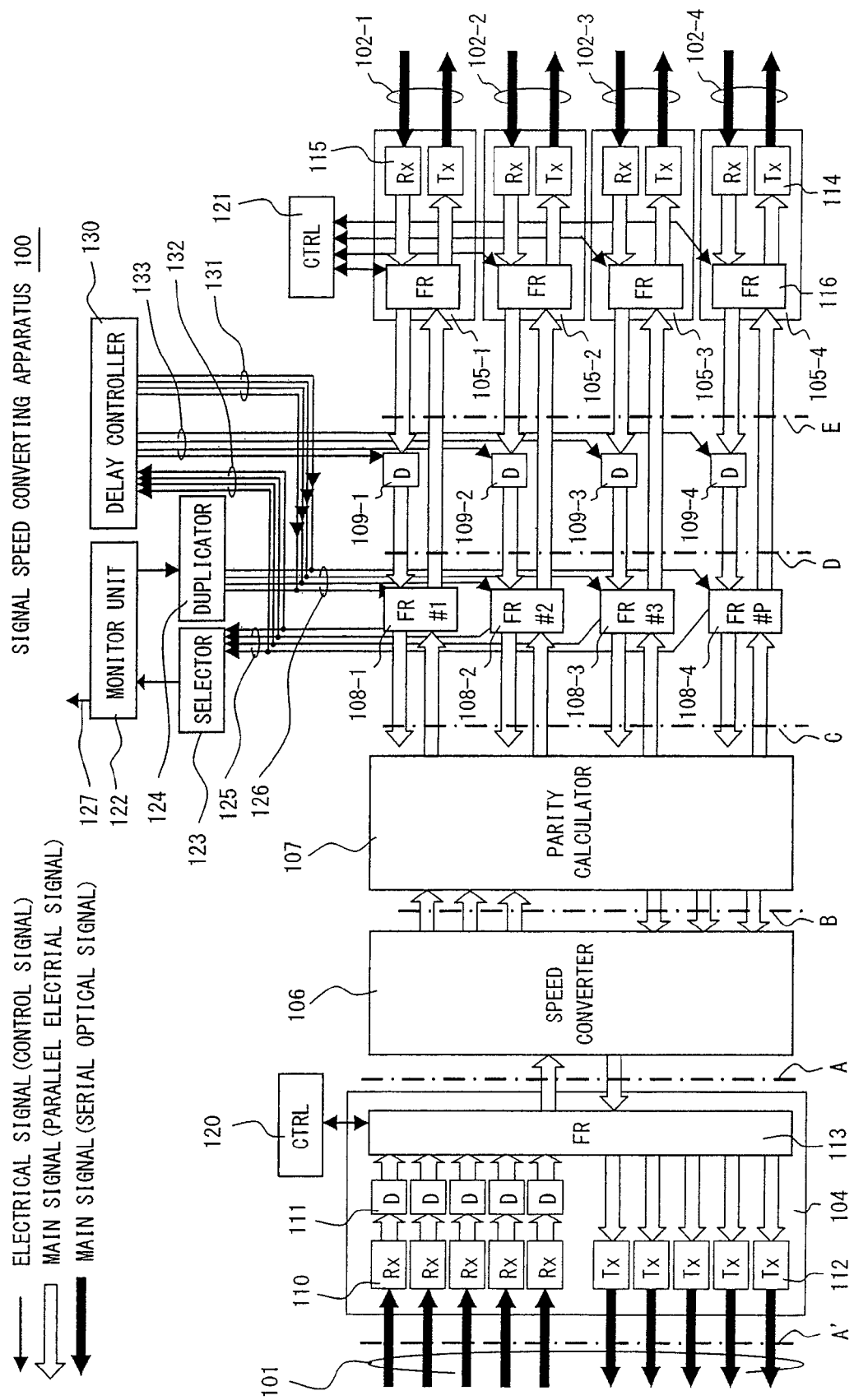
FIG. 1 is a configuration view of a signal speed converting apparatus according to the first embodiment of the present invention.

As a best mode of an optical transmitter to which a speed converting apparatus of the present invention is applied, as will be described later by referring to FIG. 1, a signal speed converting apparatus 100 includes first optical interfaces 104 connected to a first optical line group (transmission line and receive line) for transmitting an information frame as a serial optical signal or a logical group of parallel optical signals, a plurality of second optical interfaces 105 (105-1 to 105-4) connected to a second optical line group (transmission line and receive line), each of which transmits an information frame as a serial optical signal logically independent to each other; and a speed converter 106 that interleaves original information signals transmitted and received over the first optical interface to a plurality of internal lines and converts them into signal trains to be transmitted and received over the second optical interface.

The first optical interface has a first framer 113 that terminates an information frame in a first signal format received from the first optical line group. Each of the second optical interfaces includes a second framer 116 that converts an interleaved original information signal received from each internal line into an information frame in a second signal format and transmits it to one of optical lines of the second optical line group.

The signal speed converting apparatus 100 of the present invention includes, as management information inserting units, third framer circuits 108 (108-1 to 108-4) each being a high level framer at each internal line (transmission internal line and receive internal line) between the plurality of second optical interfaces 105 and the speed converter 106. Each of the third framer circuits 108 inserts management information including management information common among the plurality of internal lines into transmission signal trains on each internal line in an upward direction and extracts management information transmitted by an opposite signal speed converting apparatus from the receive signal trains which the second optical interface 105 output to the internal line in a downward direction.

Each of the internal lines in a downward direction is provided with a delay buffer circuit 109 (109-1 to 109-4) for canceling delay time difference occurred when the optical signals received by the second optical interfaces were transmitted in parallel on a WDM network. In the exemplary embodiment, in order to supplement the reliability of the signal transmission over the second optical line group and the WDM optical path, a parity calculator 107 is provided between the signal speed converter 106 and the high level framer circuits 108 and an internal line for parity and a second optical interface for parity are added to transmit parity signals in parallel with the interleaved original information signal.

Figure 2:
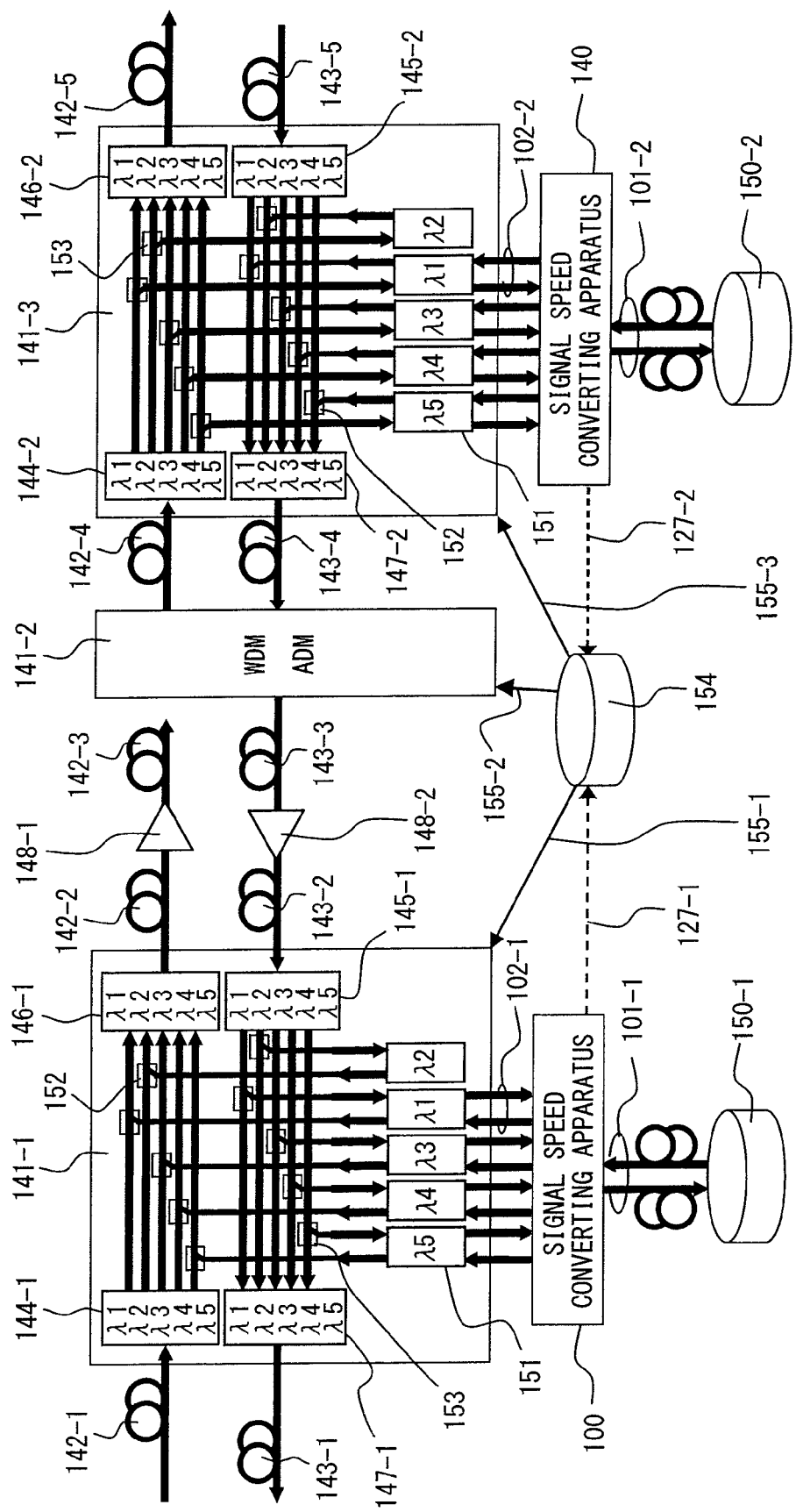
FIG. 2 is a view showing one example of a configuration of a network to which the signal speed converting apparatus of the present invention is applied.

According to the present invention, for example as shown in FIG. 2, an optical transmission system is configured by locating the signal speed converting apparatuses 100 and 140 oppositely at both sides of the WDM transmission network so that routers 150-1 and 150-2 communicate to each other via the two signal speed converting apparatuses.

First Embodiment

FIG. 1 shows the first embodiment of the signal speed converting apparatus 100 of the present invention.

In the present embodiment, parallel optical signals (for example, 20 Gbits/s line×5) received from 100 Giga Ethernet lines 101 connected to a first optical interface 104 are input to a speed converter 106. The speed converter 106 converts signal trains received by the first optical interface 104 into plural 40 Gbits/s signal trains suitable for Ethernet LAN-PHY lines 102 (102-1 to 102-4) connected to second optical interfaces 105 (105-1 to 105-4) and outputs them in parallel.

In the present embodiment, although the signals on the Ethernet LAN-PHY lines 102 are 40 Gbits/s, the number of parallel lines or the bit rate value of each line is not important. For example, a currently standardized 10 Gbits/s Ethernet LAN-PHY lines may be parallelly arranged by ten. In the present embodiment, the second optical interface 105 accommodating the Ethernet LAN-PHY lines is merely an example of the optical interface that transmits and receives framed information signals in an undefined interval. In the present embodiment, the frame signals in the undefined interval may be transmitted and received using formats (for example, ATM) other than the Ethernet.

Although both the first and second optical interfaces parallelly transmit optical signals over a plurality of optical paths (fibers), the essential difference therebetween is that a plurality of lines connected to the first optical interface (in the example, 100 Giga Ethernet) form a logical group (a plurality of groups in other embodiments that will be described later) and a plurality of lines connected to the second optical interface form a plurality of groups (in the present embodiment, the number of 400 Gbits/s Ethernet LAN-PHY lines are four) independent logically.

The logical group means a status where the information frames are distributed to a plurality of lines in the group so that header information or payload information having a logical meaning can be reproduced by summing the transmission signals on these lines. For example, since in the optical line group 101 accommodated in the first optical interface, the framed information signals including a header portion and a data portion are interleaved to the plurality of low speed optical lines in a bit unit, a byte unit, or a packet unit, the plurality of low-speed optical lines are considered as a logical group. On the other hand, since each packet having the independent header information is transmitted separately to each of the optical lines 102-1 to 102-4 accommodated in the second optical interfaces 105-1 to 105-4, these optical lines are considered to be a plurality of logically independent lines.

In the present invention, the optical signals received by the first optical interface are parallelly deployed to the plurality of lines connected to the second optical interface and are transmitted in a long range through the optical path via the WDM transmission equipment (not shown). The parallelly deployed and long-range transmitted optical signals are received in the second optical interface of an opposite apparatus and synthesized in the speed converter 106, such that the original signal is rebuilt. Even when a plurality of logical groups of parallel signals are input to the first optical interface, it is possible to obtain the logically same effect as the configuration shown in FIG. 1 if these signals are multiplexed once and interleaved to the plurality of lines connected to the second optical interface.

FIG. 2 is a view showing one example of a configuration of a network to which the signal speed converting apparatus 100 shown in FIG. 1 is applied. In FIG. 2, two remotely arranged routers 150-1 and 150-2 are each connected to the WDM network via the signal speed converting apparatuses 100 and 140 of the present invention.

For example, in the line in an upward direction from the left to the right in FIG. 2, high-speed optical signals (any of serial signals, parallel signals, and WDM signals may be allowed) output from the router 150-1 are input to the signal speed converting apparatus 100 of the present invention via the 100 Giga Ethernet line 101-1 connected to the first optical interface and are parallelly deployed to the four 40 Giga Ethernet LAN-PHY lines 102 connected to the second optical interface, which are in turn input to the WDM add drop end office 141-1.

In the WDM add drop end office 141-1, each of the transmission signals from the signal speed converting apparatus 100 is converted into optical signals for inter-office transmission with wavelengths $\lambda 1$, $\lambda 3$, $\lambda 4$, and $\lambda 5$ in a 40 Giga WDM transponder 151 in the related art and is input to an upward line-side wavelength multiplexer 146-1 via an optical add unit 152. The wavelength multiplexer 146-1 multiplexes the optical signals with the wavelengths $\lambda 1$ to $\lambda 5$ and sends them out as the WDM signals in an upward direction to a trunk line WDM optical path 142-2.

The WDM signals in an upward direction sequentially pass through the trunk line WDM optical path 142-2, an optical amplifier 148-1, a trunk line WDM optical path 142-3, a WDM add drop end office 141-2 and a trunk line WDM optical path 142-4, thereby to input to the WDM add drop end office 141-3.

The WDM optical signals input to the WDM add drop end office 141-3 are demultiplexed into optical signals per wavelength by an upward line-side wavelength demultiplexer 144-2. The wavelengths required for the receive-side signal speed converting apparatus 140, four wavelengths ($\lambda 1$, $\lambda 3$, $\lambda 4$, and $\lambda 5$) in the present example, among the plurality of wavelengths output from the wavelength demultiplexer 144-2 are dropped by an optical drop circuit 153, which are in turn input to the 40 Giga WDM transponder 151. The WDM transponder 151 converts the optical signals with each wavelength into optical signals of four 40 Giga Ethernet LAN-PHY lines 102-2 being intra-office lines and inputs them to the second optical interface of the receiving-side signal speed converting apparatus 140 opposite to the transmitting-side signal speed converting apparatus 100. The signal speed converting apparatus 140 converts the speed of the four receive signals and transmits them to the opposite-side router 150-2 via the 100 Giga Ethernet line 101-2 connected to the first optical interface.

The signals in a downward direction transmitted from the router 150-2 to the router 150-1 are forwarded via the 100 Giga Ethernet line 101-2, the signal speed converting apparatus 140, the 40 Giga Ethernet LAN-PHY line 102-2, the 40 Giga WDM transponder 151, the optical add unit 152, the optical wavelength multiplexer 147-2, the trunk line WDM optical path 143-4, the WDM add drop end office 141-2, the trunk line WDM optical path 143-3, the optical amplifier 148-2, the trunk line WDM optical path 143-2, the downward line-side wavelength demultiplexer 145-1, the optical drop unit 153, the 40 Giga WDM transponder 151, the 40 Giga Ethernet LAN-PHY line 102-1, the signal speed converting apparatus 100, and the 100 Giga Ethernet line 101-1, likewise the signal paths in the aforementioned upward line.

FIG. 2 describes the case where the optical line 101-1 connecting the router 150-1 to the signal speed converting apparatus 100 and the optical line 101-2 connecting the router 150-2 to the signal speed converting apparatus 140 are the 100 Giga Ethernet lines, however, the optical lines 101-1 and 101-2 connected to the first optical interface does not need to have the same protocol or signal transmission speed. For example, they may be different lines from each other so that one is a 100 Giga Ethernet line and the other is a 160 Giga SONE line.

In FIG. 2, although the signal speed converting apparatus 100 is described as an apparatus completely independent from the WDM add drop end office 141-1, it may be configured to be integrated with the WDM add drop end office 141-1 at the slight expense of the generality of the signal speed converting apparatus 100.

In an extreme example, likewise the wavelength demultiplexing transponder in the related art, the configuration mounting the long-range 40 Giga optical interface for WDM transmission as the second optical interface 105 shown in FIG. 1 may be allowed. With such a configuration, the 40 Giga WDM transponder 151 shown in FIG. 2 is not needed so that the connection line 102-1 of the second optical interface can directly connect the optical add unit 152 to the optical drop unit 153. In this case, the apparatus of the present invention has a different configuration from the wavelength demultiplexing transponder in a function of writing the high level frame for management information by a third framer circuit.

The signal speed converting apparatus 100 shown in FIG. 1 includes the transmitting-side signal path (signal path from the left to the right in FIG. 1) from the information device such as the router 150 shown in FIG. 2, toward the WDM transmission equipment (WDM add drop end office 141) and the receiving-side signal path (signal path from the right to the left in FIG. 1) from the WDM transmission apparatus to the information device. Referring to FIG. 1, the operation of the signal speed converting apparatus 100 in the transmitting-side signal path will first be described and the operation of the signal speed converting apparatus 100 in the receiving-side signal path will then be described.

The 100 Giga parallel optical signals input to the first optical interface 104 via the connection line 101 (first optical line group) from the information device, such as the router, etc., are converted into electrical signals by five 20 Giga optical receivers 110 parallelly arranged within the first optical interface 104 (100 Giga Ethernet optical interface) and are input to the first framer circuit 113 (100 Giga Ethernet framer circuit) in a status where the 100 Giga parallel optical signals are synchronized with each other by compensating a transmission delay time difference (skew) through a delay buffer circuit 111.

The first framer circuit 113 terminates the information frame of the first format (100 Giga Ethernet) included in the receive signal. In other words, the first framer circuit 113 removes an unnecessary header portion or trailer portion when it releases encoding such as 66B64B, and extracts an Ethernet frame from the payload and inputs it to the speed converter 106.

In FIG. 1, a black arrow indicates the optical signals and a white arrow indicates a flow of electrical digital signals. The electrical signals generally transmit a logical group of signal trains in parallel over the plurality of lines. In the drawing showing the embodiment of the present invention, parallel electrical signals logically forming a group are indicated by one white arrow.

The speed converter 106 sequentially writes input signals (data) in a common buffer memory and cyclically outputs stored data to plurality of internal lines in an upward direction in an interleave unit to realize the speed conversion between the input signal and the output signal. In the present embodiment, five parallel (five groups) signals are input from the first framer circuit 113 to the speed converter 106, and three parallel (three groups) signals are output from the speed converter 106. In this case, the data speed (bit rate) of each output line of the speed converter 106 becomes 20 G×5/3=33.3 Gbits.

If the data speed of each output line of the speed converter 106 is required to have an integral number of bit rates, such as 40 Gbits/s, for example, a length of an idle pattern written in an inter-frame gap portion may be controlled. When the data loss is allowed, for example, speed conversion may be performed with a configuration having two 40 Gbits/s output signal lines and a band shaper inserted just before the speed converting unit so as to remove Ethernet packets having low priority.

The parallel signals interleaved and output to the three internal lines from the speed converter 106 are input to a parity calculator 107. The parity calculator 107 generates, for example, parity codes by an exclusive-OR operation between the parallelly input signal lines and outputs the parity codes to a redundancy circuit for parity in parallel with the signal line. The parity calculator 107 may be allowed to output error correction codes having higher data reproduction or error correction performance by increasing the number of redundancy lines for parity. In the present embodiment, a circuit unit in a later stage connected to the parity calculator 107 handles the redundancy line outputting the parity signal without being differentiated from the internal line outputting the data bit. Conditions for achieving this will be described later.

The four parallel output signals from the parity calculator 107, which outputs parity bits as the fourth output, are input to high level framers 108 (108-1 to 108-4) forming the third framer circuit. The high level framer 108 separately inserts the management information (overhead information) for the input signal train from each input line. The management information is generated in a monitor unit 122 and is duplicated in a duplicator 124. By the insertion of the management information, the necessary and sufficient management information for each line can be transmitted to the opposite apparatus.

The four parallel signals output from the high level framer circuit 108 are input to the 40 Giga Ethernet LAN-PHY optical interfaces 105-1 to 105-4, respectively, being the second optical interface. The second optical interface 105-$i$ ($i$=1 to 4) includes a 40 Giga Ethernet LAN-PHY framer circuit 116 being the second framer circuit, a 40 Giga optical transmitter 114 connected to the second framer circuit 116, and a 40 Giga optical receiver 115. The 40 Giga Ethernet LAN-PHY framer circuit 116 performs such processing as inherent encoding to a signal layer (in the present example, Ethernet LAN-PHY) and addition of overhead, on the input signals. The output signals from the 40 Giga Ethernet LAN-PHY framer circuit 116 are converted into the optical signals in the 40 Giga optical transmitter 114 and are output to the 40 Giga Ethernet LAN-PHY lines 102-$i$ (second optical line group) ($i$=1 to 4).

Hereinafter, an operation of the receiving-side signal path of the signal speed converting apparatus 100 will be described.

The optical signals input from the 40 Giga Ethernet LAN-PHY lines 102-$i$ ($i$=1 to 4) are converted into electrical signals in the 40 Giga optical receiver 115 of the second optical interface 105-$i$ and are subjected to such processing as decoding according to the signal layer (in the present example, Ethernet LAN-PHY) and the extraction of the overhead, etc. in the second framer circuit 116 and are then output to the plurality of internal lines in a downward direction, which are in turn input to delay buffer circuits 109-$i$ ($i$=1 to 4).

The delay buffer circuit 109-$i$ is provided with a delay control signal 133 from a delay controller 130 so that the delay time difference (skew) occurred during the transmission of the parallel signals from the opposite apparatus over the optical network is completely cancelled. The output signals from the second framer circuit 116 of the second optical interface 105-$i$ is subjected to timing correction (deskew) according to the delay control signal 133 in the delay buffer circuit 109-$i$ so that the interleaved signal trains are resynchronized.

The four resynchronized parallel signals are input to the parity calculator 107 via the third framer and are subjected to the loss bit reproduction or error correction processing by a reverse parity operation so that the original 40 Giga×3 parallel signals are recovered. The signals recovered in the parity calculator 107 are converted into 100 Giga Ethernet signals by the speed converter 106 and are then input to the 100 Giga optical interface 104 being the first optical interface.

The 100 Giga Ethernet signals input to the first optical interface 104 are provided with a header portion and a trailer portion and subjected to the encoding processing by the 100 Giga Ethernet frame circuit 113 being the first frame circuit and thereafter, parallelly output to the five 20 Giga optical transmitter 112. The optical signals output from the 20 Giga optical transmitter 112 are output to the 100 Giga Ethernet line 101.

A transmission signal processing in the signal speed converting apparatus 100 will be described with reference to FIGS. 3A to 3D.

Figure 3A:
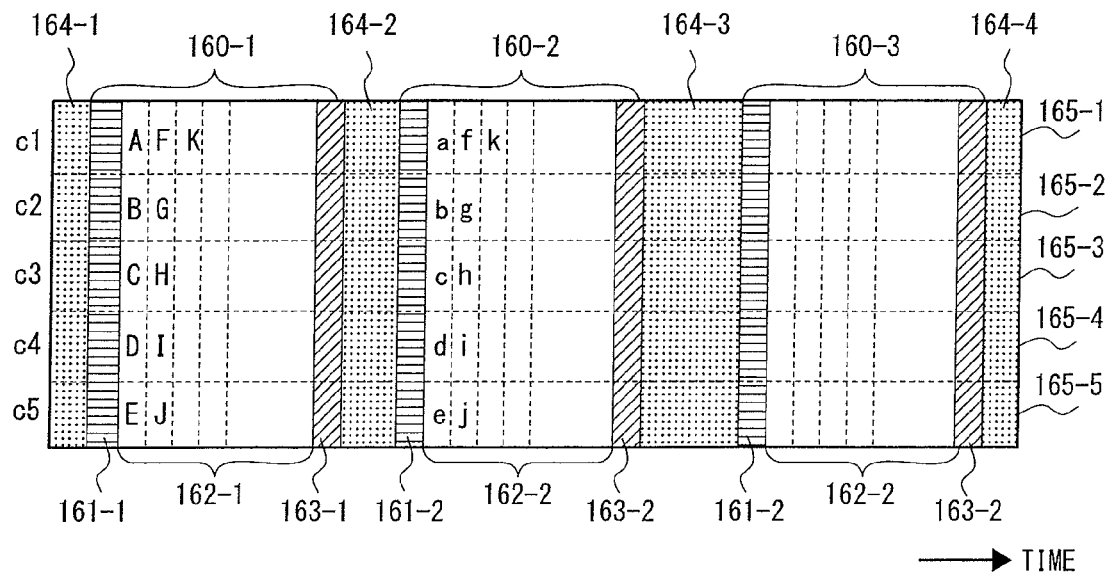
FIGS. 3A to 3D are explanation views of a transmission signal processing in the signal speed converting apparatus of the first embodiment.

FIG. 3A shows a transmission data observed at a point "A" of FIG. 1, that is, a frame structure of the 100 Giga Ethernet signal output from the first framer circuit 113. FIG. 3A shows three Ethernet frames 160-1 to 160-3 along a time axis (horizontal axis). The inter-frame gaps 164-1 to 164-4 in which predetermined idle patterns are written are formed between the frames.

Each Ethernet frame 160-$i$ includes a header portion 161-$i$, a data portion 162-$i$, and a trailer portion (FCS portion) 163-$i$. In the present example, the header portions 161-$i$, the data portions 162-$i$, and the trailer portions 163-$i$ are interleaved to five internal lines c1 to c5 in a byte unit so that they are parallelly transmitted as signal trains 165-1 to 165-5.

Byte data items forming the data portion serially arranged in the Ethernet frame transmitted from the router 150-1 in order of A, B, C, D, E, F . . . . These byte data items are cyclically distributed into the internal lines c1, c2, c3, c4, c5 by the first framer circuit 113 and are transmitted to the speed converter 106 in a later stage in the interleaved status as shown in the data portion 162-1. For clarity, although the Ethernet frames received from the 100 Giga Ethernet lines 101 are parallelly transmitted over the five internal lines c1 to c5, in an actual application, each Ethernet frame is parallelly transmitted over the plurality of internal lines, for example, the 40 internal lines having a speed of 2.5 Gbps. In the present invention, a logical group of serial data trains can be parallelly transmitted over the plurality of lines, but the number of internal lines is not specifically limited.

Figure 3B:
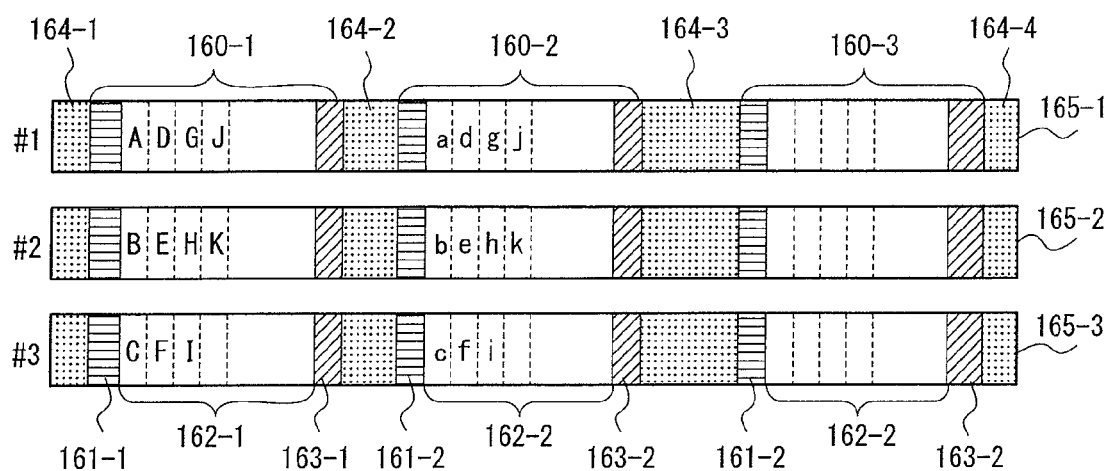

FIG. 3B shows the transmission data from the speed converter 106 observed at a point "B" of FIG. 1.

The speed converter 106 interleaves the Ethernet frames shown in FIG. 3A to the three internal lines and logically convert them to the three signal trains 165-1 to 165-3. The data bytes A, B, C, D . . . are interleaved (cyclically distributed) to the internal lines #1 to #3 so that they takes a status indicated on the data portion 162-1. The contents of the header portion 161 and the FCS portion 163 are interleaved to the internal line #1 to #3, like the data portion. When separately observing the signal trains 165-1 to 165-3, the contents of the header portion 161 and the FCS portion 163 are unclear and the frame separately extracted from each Ethernet signal cannot be considered as the Ethernet signal.

Figure 3C:
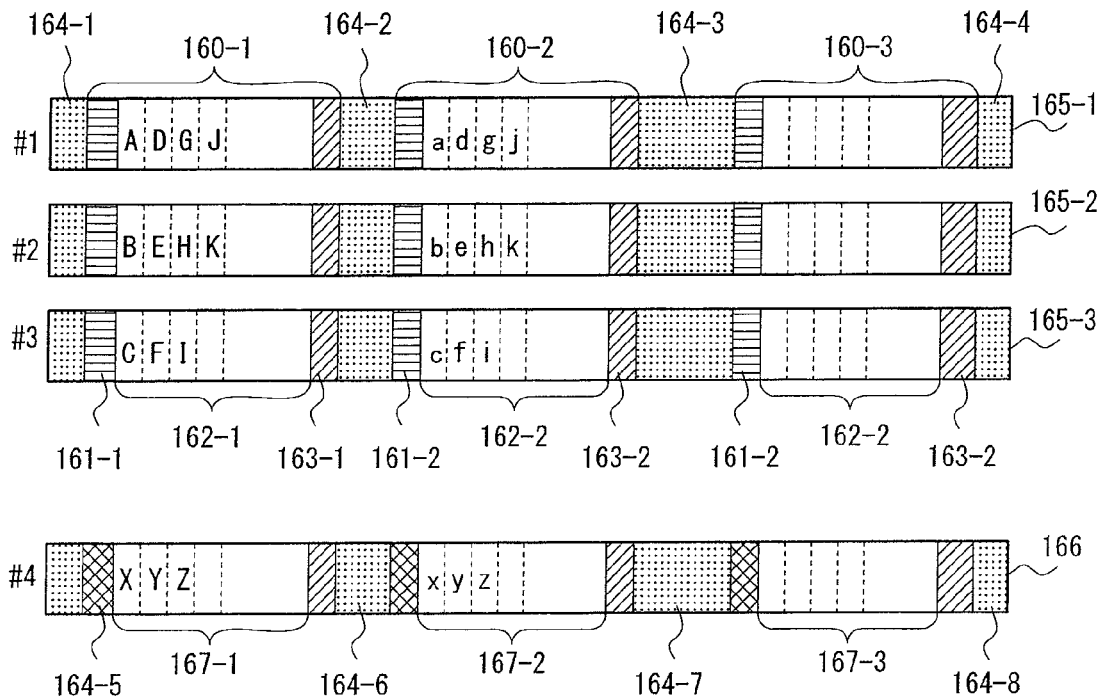

FIG. 3C shows the transmission data from the parity calculator 107 observed at a point "C" of FIG. 1.

In the present embodiment, the parity calculator 107 performs the parity operation only on the Ethernet frame portion (header portion 160-1 to FCS portion 163) of the signals received from the speed converter 106 as the operation object to generate a parity code train 166. The parity code train 166 output to the internal line #4 includes parity code portions 167 (167-1, 167-2, and 167-3) and the idle pattern portions 164 (164-5, 164-6, 164-7, and 164-8) for the inter-frame gap.

The parity code train 166 is also provided with the idle pattern portion 164, making it possible to write the management information to be described below or facilitate the decision of the Ethernet frame area in the receiving side. Each signal train parallelly output from the parity calculator 107 may be provided with special marks that can easily identify start positions and end positions of each Ethernet frame area.

Figure 3D:
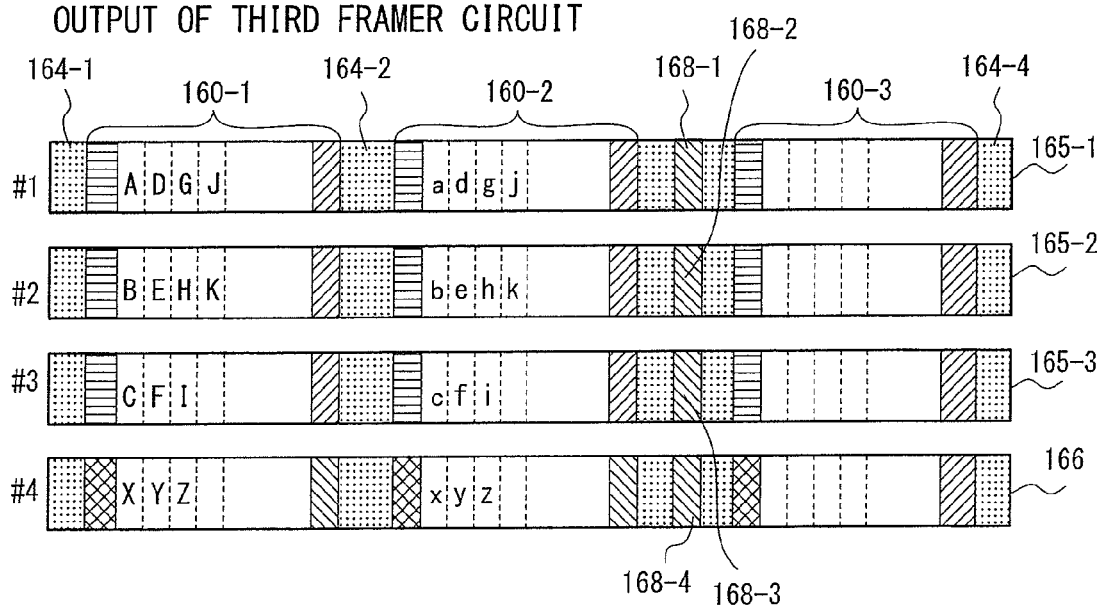

FIG. 3D shows the transmission data from the third framer circuits 108-1 to 108-4 observed at a point "D" of FIG. 1.

In the present embodiment, for the four signal trains including the signal trains 165-1 to 165-3 and the parity code train 166, the management information 168-1 to 168-4 is inserted by the framer circuits 108-1 to 108-4 being the high level third framer. The management information 168-$i$ ($i$=1 to 4) includes line inherent information and common management information. The common management information may include, for example, status information on the signal speed converting apparatus 100, line status of an upward line and a downward line, a control command from the signal speed converting apparatus 100 to the opposite apparatus (signal speed converting apparatus 140), an alarm, and information such as a response for the control command from the opposite apparatus, etc. The management information 168-1 to 168-4 is separately inserted into each transmission signal train without being interleaved to the plurality of lines.

The management information 168-$i$ is inserted into each signal train, for example, by detecting the inter-frame gap from each transmission signal train and overwriting on the idle pattern portion 164. Considering the signal processing in the receiving side, it is preferable that the management information is same in length on the plurality of internal lines #1 to #4 and is inserted into all internal line in synchronization with each other.

Generally, since the band of each internal line within the signal speed converting apparatus is not entirely occupied by the Ethernet frame, the possibility of absence of the interframe gap (idle pattern portion 164) to be the insertion position of the management information is extremely small. Each of high level framers 108-1 to 108-4 (third framer circuits) buffers the signal train receive from each internal line, detects the idle pattern portion 164, and writes the management information 168.

When the management information is regularly inserted in each signal train, if the idle pattern portion to be the insertion position of the management information is short, it may be allowed to first insert the management information and then delay the transmission timing of the subsequent frame. On the contrary, when the management information is irregularly inserted, if the idle pattern portion to be the insertion position of the management information is short, it may be allowed to delay the insertion timing of the management information until the idle pattern with a certain length is reached.

The signal trains 165-1 to 166 with the management information 168 inserted by the high level framer 108 are parallelly transmitted to the second optical interfaces 105-1 to 105-4 (40 Giga Ethernet LAN-PHY optical interface). In each of the second optical interfaces, the second framer circuit (116-1 to 116-4) performs encoding processing on the interleave frame and the parity frame and adding the overhead information, and then outputs the transmission signal train to the 40 Giga optical transmitter 114. Thus, the interleave frame, the parity frame, and the management information are converted into the optical signals and transmitted to the external second optical line groups 102-1 to 102-4 (40 Giga Ethernet LAN-PHY line).

Hereinafter, a receive signal processing in the signal speed converting apparatus 100 will be described with reference to FIGS. 4A to 4E.

The optical signals input from the 40 Giga Ethernet LAN-PHY lines 102-1 to 102-4 to the second optical interfaces 105-1 to 105-4 are converted into electrical signals by the 40 Giga optical receiver 115 and are then input to the second framer circuits 116-1 to 116-4, which perform the removal of the overhead information and decoding processing.

Figure 4A:
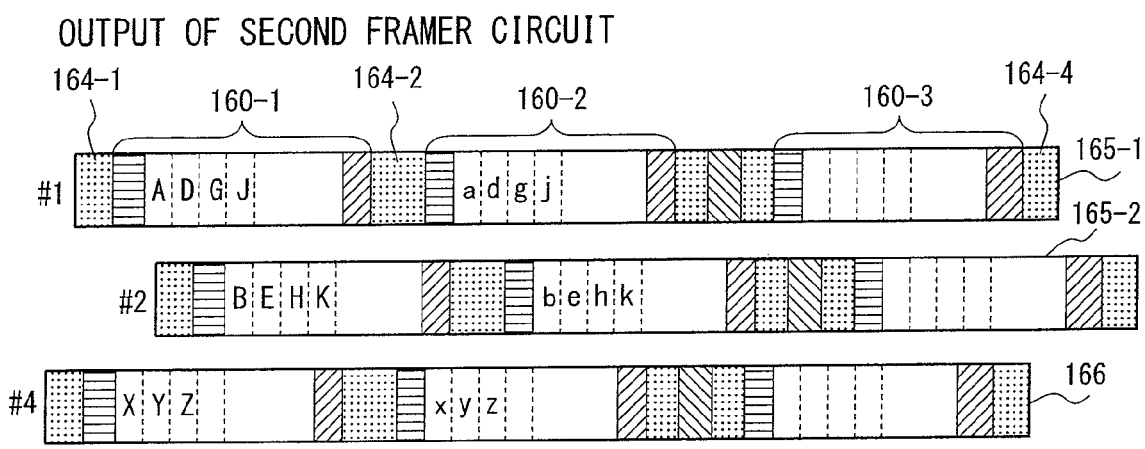
FIGS. 4A to 4E are explanation views of a receive signal processing in the signal speed converting apparatus of the first embodiment.

FIG. 4A shows the output signal trains of the second framer circuits 116-1 to 116-4.

It is assumed here that the receive data of the 40 Giga Ethernet LAN-PHY line 102-3 is lost by the failure occurred on the external optical path and the signal train 165-3 cannot be output from the second framer circuit 116-3. Further, it is assumed that the arrival times of the signal trains 165-1, 165-2, and 166 are different due to the transmission delay difference on the external optical path.

The signal trains 165-1, 165-2, and 166 are input to the delay buffer circuits 109-1 to 109-4 of FIG. 1, respectively, in order to compensate the transmission time difference and input to the high level framers 108-1, 108-2, and 108-4 (third framer circuits) The compensation control for the transmission delay difference is performed by the delay controller 130 to be described later.

Figure 4B:
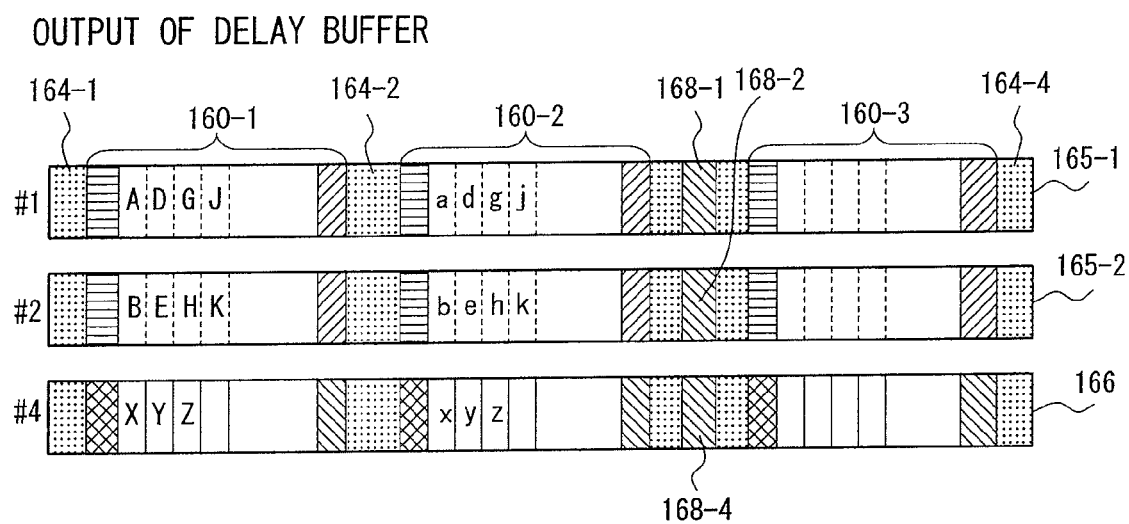

FIG. 4B shows the signal trains 165-1, 165-2, and 166 after the compensation for the transmission delay difference observed at a point "D" of FIG. 1.

Figure 4C:
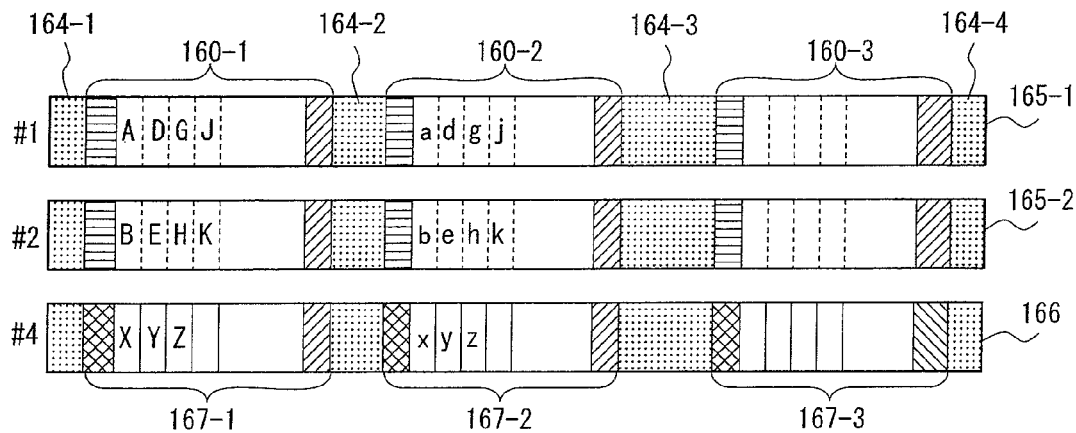

The high level framer 108-i (i=1, 2, 4) extracts the management information 168 from the received signal train, and overwrites, as shown in FIG. 4C, an idle pattern on the management information portion of each signal train and outputs it to the parity calculator 107. Although signal trains whose transmission delay differences are compensated are supplied to the high level framer 108 in FIG. 1, the compensation control of the transmission delay differences for the signal trains may be performed after the management information extraction by locating the delay buffer circuit 109-i (i=1 to 4) between the high level third framer 108-i and the parity calculator 107.

Figure 4D:
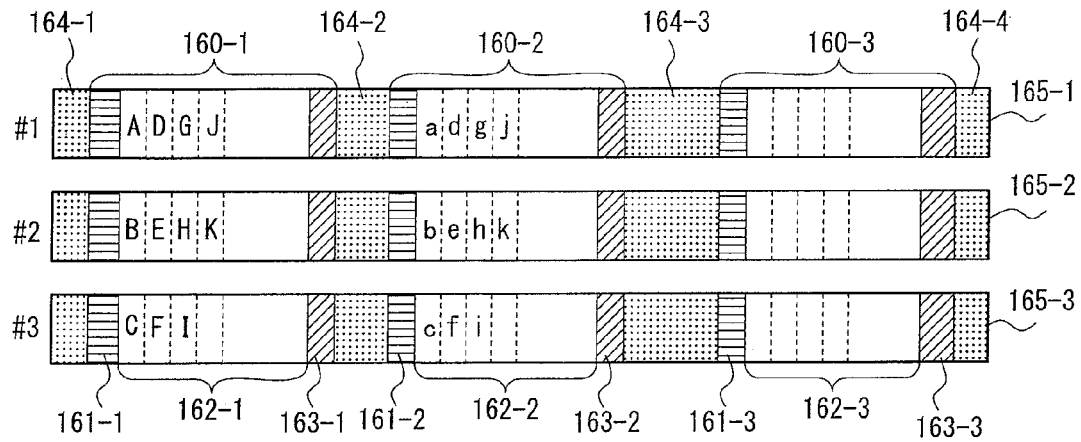

The parity calculator 107 performs the reverse parity operation based on the received signal trains 165-1, 165-2, and 166 to reproduce the lost signal 165-3. FIG. 4D shows the signal trains 165-1 to 165-3 output from the parity calculator 107 observed at a point "B" of FIG. 1. The reverse parity operation is performed in the Ethernet frame area 160 on which the parity operation is performed during the transmission.

As in the present embodiment, if the data transmitting side performs the parity operation before the management information is added and the data receiving side removes the management information and performs the reverse parity operation by the high level framer 108, it becomes possible to separately provide the management information to each of the signal trains of the all line including the parity line. However, if the data transmitting side performs the parity operation after the management information is added, since the management information cannot be inserted into the signal trains on the parity line, the parity line cannot be handled like other data signal lines.

Figure 4E:
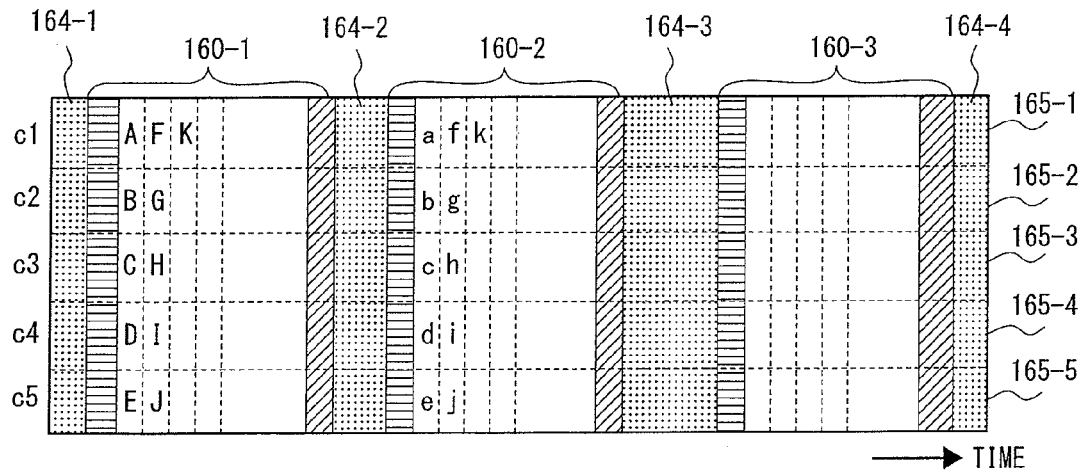

The output signal trains 165-1 to 165-3 from the parity calculator 107 are input to the speed converter 106, and as shown in FIG. 4E, converted into the original 100 Giga Ethernet signal trains 165-1 to 165-5. The 100 Giga Ethernet signal trains 165-1 to 165-5 are input to the first optical interface 104, subjected to the encoding processing and the overhead adding suitable for communication protocols on the router and the connection line 101 (100 Giga Ethernet line) in the first framer circuit 113, and then output to the line 101 via the 20 Giga optical transmitter 112.

Next, an operation of the monitor unit 122 shown in FIG. 1 will be described.

The monitor unit 122 is provided with the function of whole controlling the signal speed converting apparatus 100 and the function of communicating management information with the opposite signal speed converting apparatus (signal speed converting apparatus 140 shown in FIG. 2).

In FIG. 1, 120 is a first controller for controlling the first optical interface 104, and 121 is a second controller for controlling the second optical interfaces 105-1 to 105-4. These controllers are connected to the monitor unit 122 via a control line (not shown).

The monitor unit 122 generates management information that includes status information (line information) on the first optical interface 104 collected from the first control unit 120, status information (line information) on the second optical interfaces 105-1 to 105-4 collected from the second control unit 121, and other status information on the signal speed converting apparatus 100 collected by the monitor unit 122. The monitor unit 122 notifies the opposite apparatus 140 of the management information generated, and receives management information generated by the opposite apparatus 140. In order to make the signal speed converting apparatuses 100 and 140 cooperate with each other, the monitor unit 122 may include the control command to the management information or the response information to the opposite apparatus, if necessary.

The management information generated by the monitor unit 122 is output to the duplicator 124 and is supplied from the duplicator 124 to the plurality of high level framers 108-1 to 108-4 (third framer circuits). Thus, as explained in FIG. 3D, the insertion of the management information into the inter-frame gap portion of the signal trains 165-1 to 166 is performed. The high level framers 108-1 to 108-4 define the writing position of the aforementioned management information as the high level frame format on the format of the parallel signal train output from the parity calculator 107 to perform the writing of the management information in the transmission signal train and the extraction of the management information from the receive signal train.

Further, in the frame receiving side, the management information extracted from each of the received signal trains by the high level framers 108-1 to 108-4 is input to a selector 123. The monitor unit 122 uses the management information having high reliability selected in the selector 123. Thus, if at least one of the plurality of WDM transmission lines connected to the opposite apparatus 140 is normal, the signal speed converting apparatus 100 can recognize the status of the opposite apparatus and the line status and start the connection operation through the parallel lines. The functions of the duplicator 124 and the selector 123 may be realized by software in the monitor unit 122 which has a processor and a memory.

Figure 5:
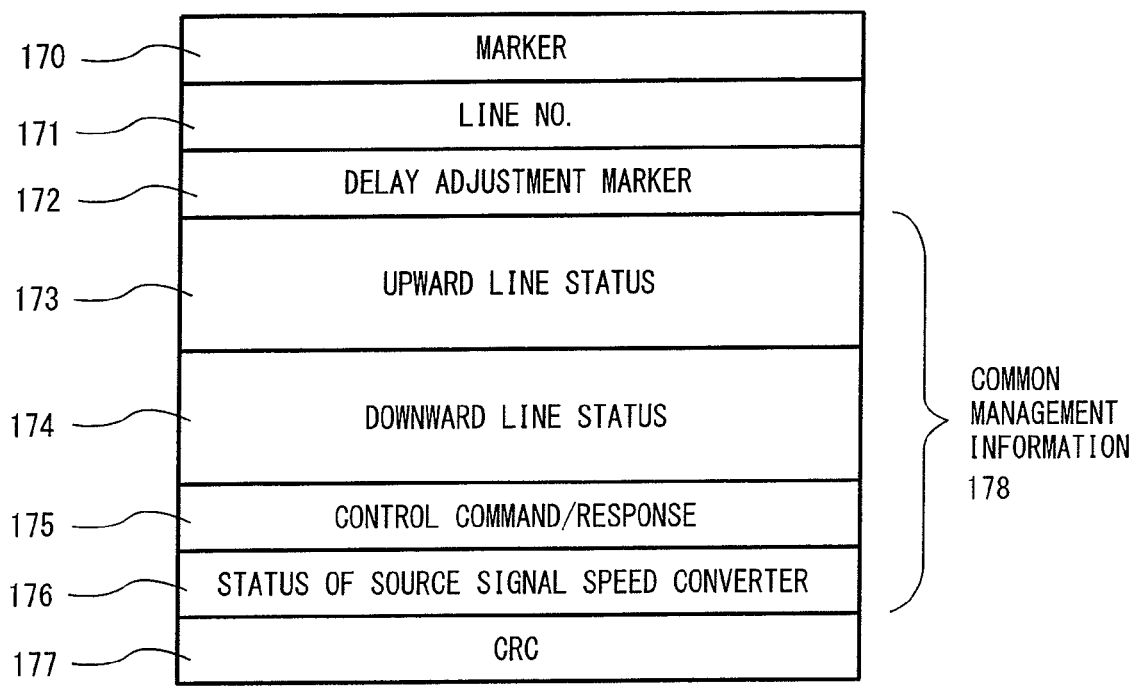
FIG. 5 is a view showing one example of a format of management information.

FIG. 5 shows one example of the format of the management information 168.

The management information shown in FIG. 5 includes a leading marker 170, a line number 171, a delay adjustment marker 172, line status information 173 of four upward lines, line status information 174 of four downward lines, a control command/response 175, status information 176 of the transmission of source signal speed converter, and a CRC 177. Among these information items, items 173 and 176 are management information 178 common to the plurality of lines and the other items are inherent line information.

As the leading marker 170, a specific bit pattern indicating the leading of the management information is setup, and as the line number 171, inherent numbers to be identifiers of each line are setup. Each high level framer 108-$i$ ($i$=1 to 4) of the frame receiving side uses the delay adjustment marker (deskew marker) 172 to adjust the delay time difference between the receive signal trains. The line status information 173 of the four upward lines and the line status information 174 of the four downward lines indicate the status of the upward lines and the downward lines in the second optical interfaces 105-1 to 105-4. The length of the line status information 173 and 174 is different according to the number of parallel lines and the number of status classifications. The status classifications informed in the line status information may include "normal", "signal interruption", "signal quality deterioration (increase in error rate)", "change to spare line".

As the control command/response 175, a command to the opposite apparatus, a query, and a response are setup. As the status information 176, status codes indicating a status of a self-apparatus, such as "normal", "during a reset", "failure", "existence or non-existence of an input", etc. are setup. As the CRC 177, a cyclic code for error correction corresponding to the contents of the management information 168 is setup.

Among these information items, the items 173 to 176 are duplicated as the common management information 178 by the duplicator 124 and the management information with the same contents is sent out to the parallel lines over the high level framers 108-1 to 108-4. However, the common management information 178 is not limited to the items 173 to 176 but may further include other information items. For example, the line status information of the first optical interface may be added or some of the items 173 to 176 may be removed. In actual applications, in order to reduce the number of bytes of the management information to be transmitted in the inter-frame gap, the common management information 178 (items 173 to 176) may be divided into plural small blocks so as to transmit block by block.

Hereinafter, the delay controller 130 of FIG. 1 will be described.

The delay controller 130 compensates for the delay time difference in the parallel signals received from the second optical interfaces 105-1 to 105-4 to control the delay amount of the delay buffers 109-1 to 109-4, such that the timings of respective receive signals are conformed to each other.

For example, when the high level framers 108-1 to 108-4 (third framer circuits) of the frame transmitting side insert the management information into each of the transmission signal trains at the same timing, the receiving side can detect the delay time difference of the receive signal train using the leading edge of the management information as the marker. In this case, in the signal speed converting apparatus of the frame receiving side, the high level framers 108-1 to 108-4 inform the delay controller 130 of the detection timing of the leading edge (marker) of the management information included in the receive signal train as position information 132, and the delay controller 130 generates the delay control signal 133 to adjust the marker detection timings in the high level framers 108-1 to 108-4 and controls the delay amount of the delay buffer circuits 109-1 to 109-4.

In the case where the insertion of the management information into the transmission signal train by the frame transmitting side is performed in the asynchronous manner, the delay controller 130 transmits the delay adjustment marker 131 to the high level frames 108-1 to 108-4 and each high level framer writes the delay adjustment marker 131 as the delay adjustment marker 172 in the management information 168. In this case, the signal speed converting apparatus to be frame receiving-side adjusts the delay amount of the receive signal train according to the delay adjustment marker 172 extracted from each management information 168. As the delay adjustment marker 131, for example, deviations of the insertion position of the management information in each transmission signal train or the number of bits between the end point of a proceeding frame and the insertion position of the management information may be used.

When the delay time difference (delay amount) is so large that it exceeds the insertion period of the management information, for example, management information identification number to be incremented every writing the management information can be used as the delay adjustment marker 172. In this case, in the signal speed converting apparatus of the frame receiving side, the high level framers 108-1 to 108-4 inform the delay controller 130 of the delay adjustment marker 172 detected from the management information in the receive signal train, and the delay controller 130 adjusts the delay time of the delay buffer circuits 109-1 to 109-4 so that the management information having the same identification number is input to the high level framers 108-1 to 108-4 at the same timing.

In the present embodiment, since the optical signals output from the second optical interfaces 105-1 to 105-4 to the optical transmitters 114-1 to 114-4 arrive at the opposite apparatus after passing in parallel through optical fiber paths of the trunk line section, each of which comprises individual optical fiber, transponder, and patch cable, the delay time difference (skew) occurs between the optical signals. However, if the transmission signals of the same optical transmitters 114-$i$ ($i$=1 to 4) pass through the same optical path in the trunk line section, the skew amount is in the correctable range by the buffer memory provided in a digital IC, such as an FPGA, etc.

The primary factor of the skew occurrence is the difference in length of optical paths from the second optical interface to the WDM transmission end office and the difference in length of the patch cables in each WDM transmission end office. However, even if the delay difference corresponding to an optical fiber cable length, for example, up to 20 m occurs in these sections, the skew amount is about 100 nanoseconds. If the transmission speed is 40 Gbits/s, the value of the skew amount is about 4000 bits which is an order not having any problems in practical use.

However, there is possibility of failing in information transmission when the delay time difference exceeds the maximum allowable range, for example, between the optical signals passing through the trunk line paths different from each other or the optical signals passing through the specific transmission apparatus. Hence, in the network shown in FIG. 2, the delay time difference between the parallel lines over the whole network is managed by a network management apparatus 154.

The signal speed converting apparatuses 100 (140) of the present invention previously calculates the maximum allowable delay time difference between the parallel lines and transmits a line allocating request 127-1 designating the allowable delay time difference to the network management apparatus 154.

Upon receiving the line allocating request 127-1, the network management apparatus 154 selects an WDM line which satisfies the designated allowable delay time difference, by referring to a management table that stores the delay time difference information for each WDM line. The network management apparatus 154 transmits line allocating signals 155-1 to 155-3 to the WDM transmission end offices 141-1 to 141-3 so that the signal speed converting apparatus 100 reserves the required number of WDM lines. Thus, a transmission route, which previously guarantees the delay time difference between the signal speed converting apparatuses 100 and 140, is secured, making it possible to certainly transmit the information.

Figure 6A:
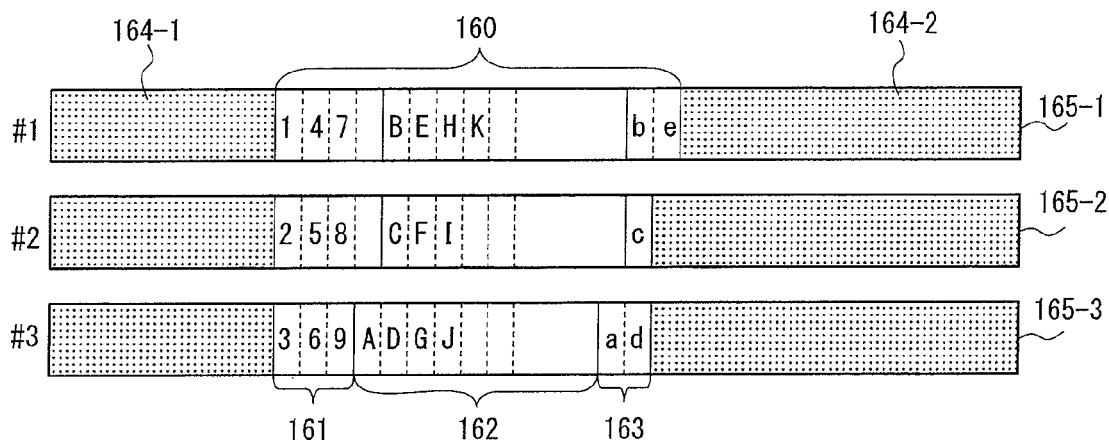
FIGS. 6A to 6C are views for explaining a method of interleaving of information signal and padding to interleaved frames.
Figure 6B:
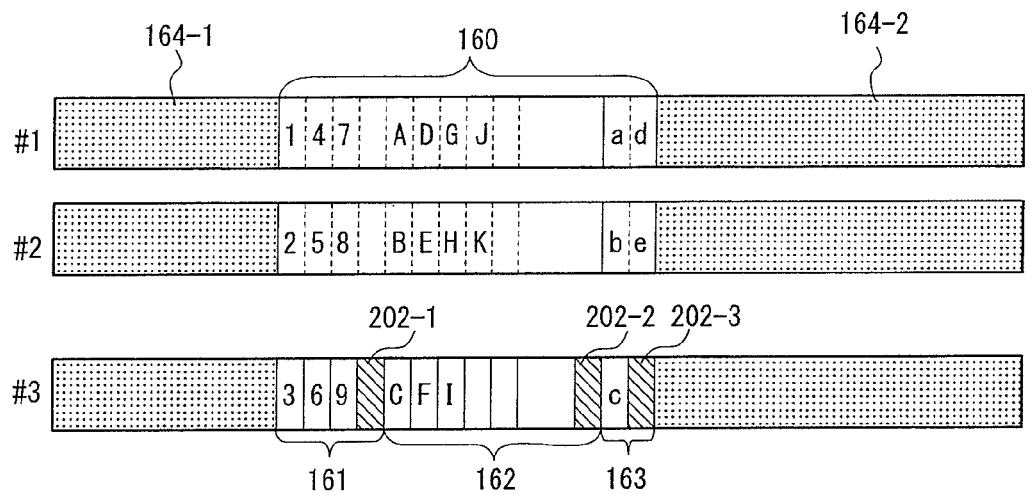
Figure 6C:
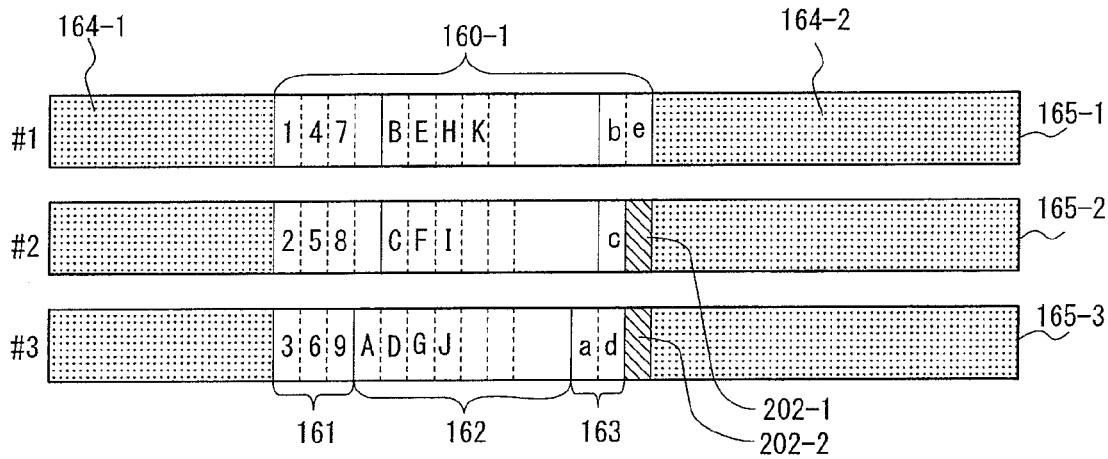
Figure 7:
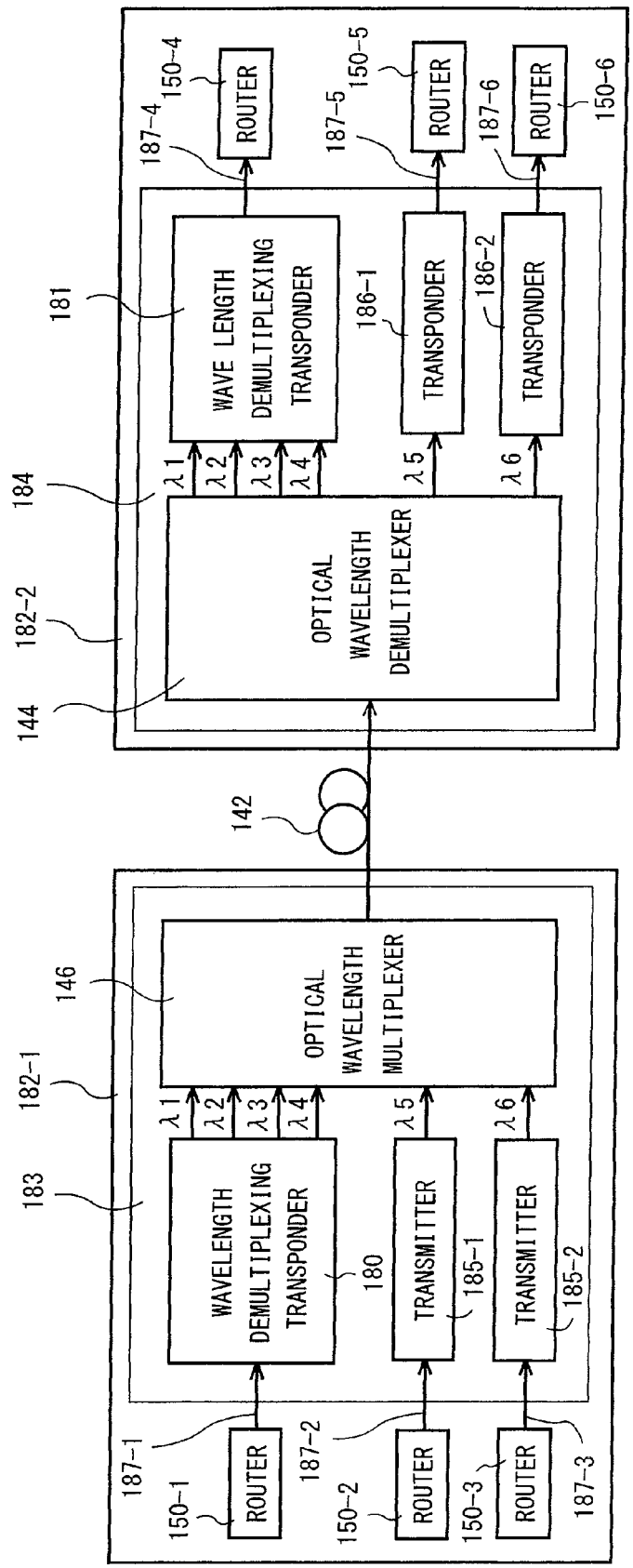
FIG. 7 is a view showing one example of a configuration of an optical network in the related art using a wavelength demultiplexing optical transponder.
Figure 8:
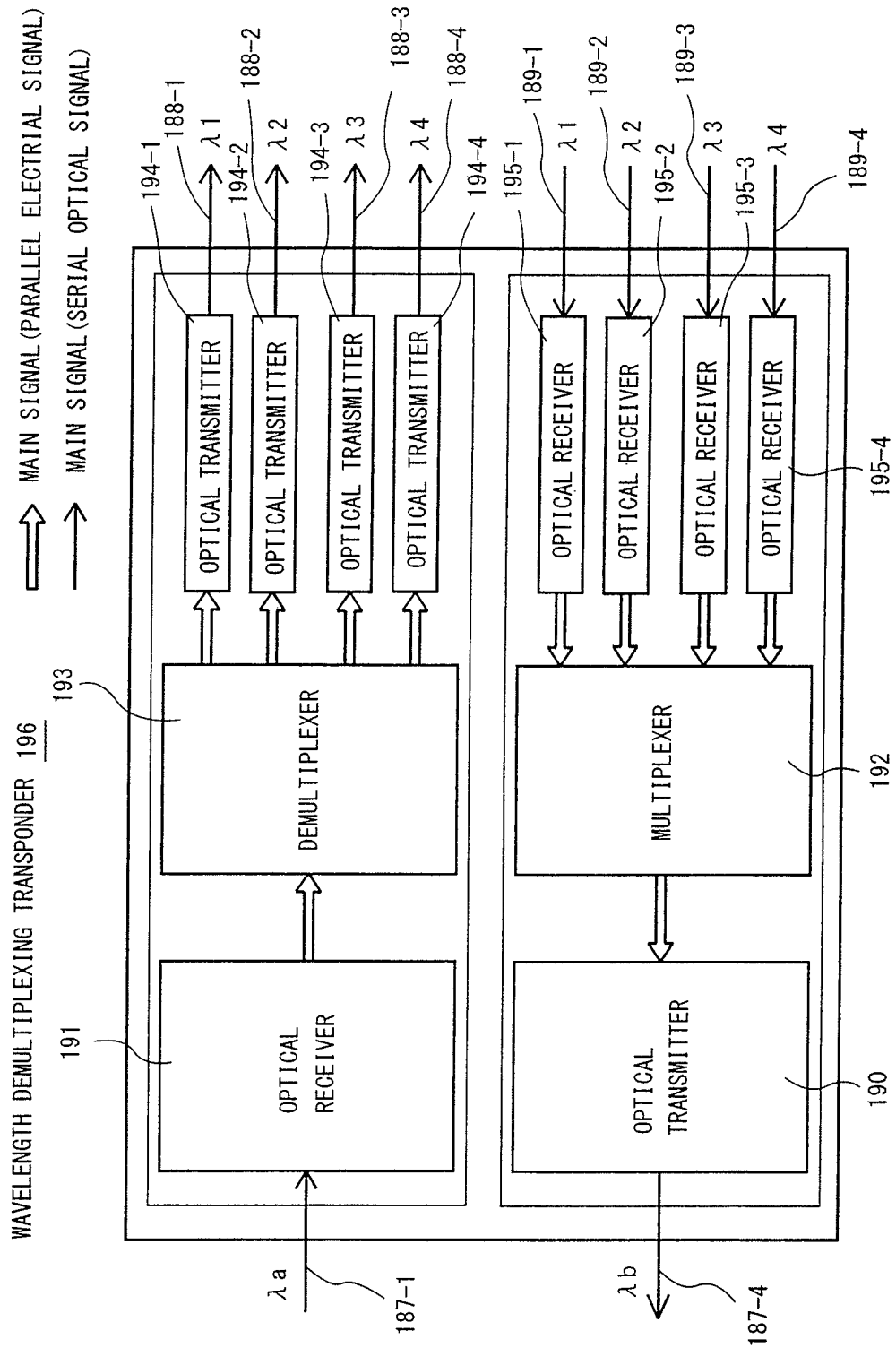
FIG. 8 is a configuration view showing one example of the wavelength demultiplexing optical transponder in the related art.

FIGS. 6A to 6C are explanation views showing one embodiment of a method of interleaving of information signal and padding to interleaved frames.

Most of transmission information transmitted via the signal speed converting apparatuses 100 and 140 is framed data such as an Ethernet frame or a SONET frame. The data amount (the number of bits or the number of bytes corresponding to the interleave unit) composing these frames is not always match the number N of lines connected to the second optical interface 105-i (1 to N) to be used for the parallel transmission.

For this reason, as shown by lines #1 to #3 in FIG. 6A, the length of the frame 160 after performing interleave and the leading edge and end position of the data portion 162 may generally be deviated per the line. As described above, if the data length varies per the line, it is difficult to detect or logically process the frame structure at the receiving side. If the data length varies per the line, the insertion position of the management information varies for each line, so that it may be difficult to reconstruct the interleave data at the receiving side.

To solve these problems, as shown by the line #3 in FIG. 6B, the present embodiment inserts, after the interleave, pad areas 202-1, 202-2, and 202-3 into the header portion 161 of the Ethernet frame, the data portion 162, the FCS portion 163, respectively, so that the length of the frame 160 and the lengths of the header portion 161, the data portion 162, and the FCS portion 163 seemingly coincide in the all lines.

These pad areas are inserted by the speed converter 106 of the transmitting-side signal speed converting apparatus and are removed by the speed converter 106 of the receiving-side signal speed converting apparatus. Since the lengths of frames coincide to each other on all lines by inserting the pad areas 202-1, 202-2, and 202-3, it is possible to easily perform the synchronization of the insertion timings of the management information and the signal processing in the receiving side. According to this method, however, the speed converter 106 requires the function of interpreting the transmission Ethernet frame to detect the length of the header portion and data portion.

If it is desired to omit the interpretation of the transmission Ethernet frame, for example, the speed converter 106 may detect only the frame length, insert the pad data 202-2 into only the FCS portion 163 as shown by the lines #2 and #3 in FIG. 6C such that the interleaved frame lengths coincide on the all lines. This method is applicable even when the connection line of the second optical interface 105 is not the Ethernet LAN-PHY. The insertion of the pad data 202 may be performed by a pad insertion circuit separately prepared from the speed converter 106.

Instead of performing the aforementioned padding, the sequence of the interleaves may be controlled so as to adjust the leading edge of the frame in each line to the frame of the first line #1, so that the frame lengths are different line by line. In this case, in the signal trains 165-2 and 165-3 on the lines #2 and #3 shown in FIG. 6C, the end of the frame is lack by 1 byte. However, since the values of the frame lengths in each signal train can accurately be judged from the contents of the constructed header portion 161 at the receiving side, the received frame can be reproduced without having the pad data 202-2.

If the transmitting-side speed converter 106 interleaves the information frame to a plurality of lines simply, for example, the header portion 161 or the FCS portion 163 is also interleaved like the signal trains 165-1 to 165-3 shown in FIG. 3B. In this case, the individual frame block extracted from the transmission signal train for each line is not considered as the Ethernet signal. Therefore, the received frame cannot accurately be processed by the apparatus for framing each signal train after the interleave, such as the second framers circuit 116 of the second optical interface 105 or the transponder in the WDM network, etc., and there is a possibility of generating the problems.

FIGS. 9A to 9D show, as one embodiment of the present invention to solve the above problems, the signal trains 165 and 166 produced when the high level framers 108-1 to 108-4 (third framer circuits) encapsulate the interleaved Ethernet frame portion 160 and the management information 168, respectively.

Figure 9A:
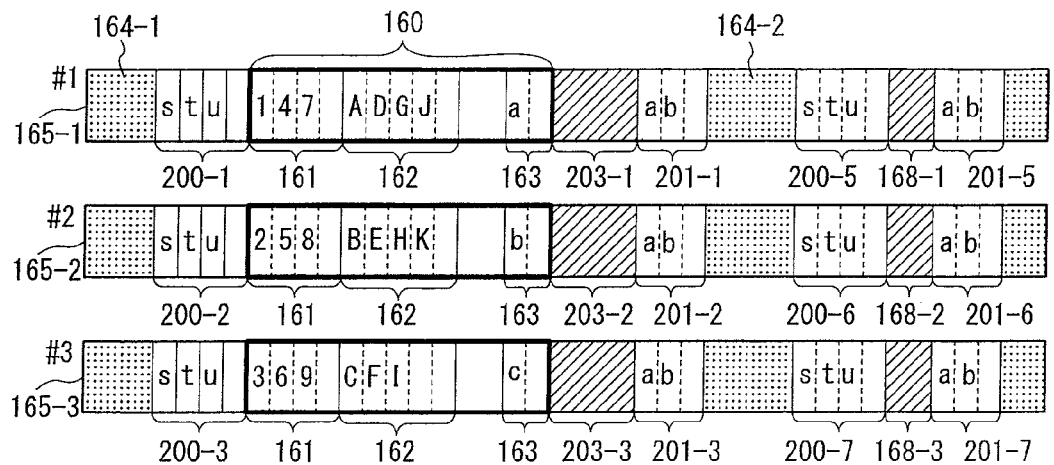
FIG. 9A to 9D are views for explaining an Ethernet frame, a parity frame, and encapsulation of management information in the signal speed converting apparatus of the first embodiment.

In the present embodiment, as shown in FIG. 9A, the Ethernet frame portion 160 including the header portion 161, the data portion 162, and the FCS portion 163 after performing the interleave is subjected to the encapsulation, and the transmitting-side high level framers 108-1 to 108-4 add new encapsulation headers 200 (200-1 to 200-3) before the Ethernet frame portion 160 and add the FCS portions 201 (201-1 to 201-3) for encapsulation after the Ethernet frame portion 160 in the signal trains 165-1 to 165-3 output to the lines #1 to #3.

By applying an individual Ethernet header, which has not been interleaved to the plurality of lines, as the encapsulation header 200, the Ethernet frame portion 160 can be transmitted as the payload of the normal Ethernet frame. In this case, each of the second optical interfaces 105-*i* (i=1 to 4) in the opposite apparatus (signal speed converting apparatus 140) can process the frame signal received from the optical path 102-*i* as the independent Ethernet frame per line. Further, each of the high level framers 108-*i* (i=1 to 4) in the opposite apparatus can extract the Ethernet frame portion 160 by detecting the encapsulation header 200 from the receive signal train and decapsulating the receive Ethernet frame.

Since the encapsulation header 200 and the FCS portion 201 is sufficient to be detected and removed at the opposite apparatus side, the contents thereof can be optionally selected by the system. For example, an address of the transmitting-side signal speed converting apparatus 100 and an address of the opposite apparatus 140 are applicable as a destination address and a source address of the encapsulation header 200. The aforementioned management information 168 may be setup in the encapsulation header by using a VLAN tag area of the encapsulation header 200. A new FCS value different from the FCS portion 163 is set into the encapsulation FCS portion 201 by performing FCS operation for each Ethernet frame portion 160.

In the present embodiment, the management information 168 (168-1 to 168-3) is also inserted into the inter-frame gap in the encapsulation form. FIG. 9A shows the encapsulation headers 200-5 to 200-7 added before the management information 168-1 to 168-3 and the FCS portions for encapsulation 201-5 to 201-7 added after the management information 168-1 to 168-3.

By detecting the encapsulation header (200-5 to 200-7) from the received signal train, the high level framers 108-1 to 108-4 in the opposite apparatus (signal speed converting apparatus 140) can extract the management information 168-1 to 168-3 following the encapsulation header. When the length of the encapsulated interleave frame does not satisfy a minimum frame length to be held by a standard Ethernet frame, the pad data may be inserted after the Ethernet frame portion 160 as shown by numerals 203-1 to 203-3 in FIG. 9A to extend the frame length.

When aforementioned encapsulation of the Ethernet frame portion and the management information is performed, the data transmission efficiency is degraded. This efficiency degradation can be mitigated, for example, by encapsulating a plurality of interleaved Ethernet frame portions 160 at once for each line. In this case, the idle portion may be removed or reduced in the payload (between encapsulation header and FCS portion for encapsulation) to align the leading edge of the interleaved Ethernet frame portion 160, in order to improve frame accepting efficiency in a capsule and frame processing efficiency on the receiving side.

Figure 9B:
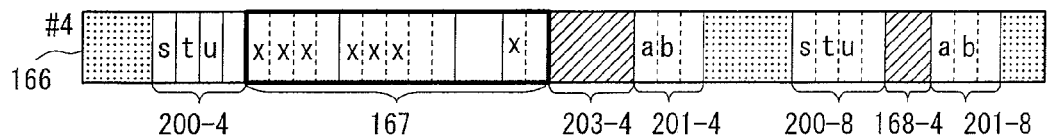

FIG. 9B shows the output signal train 166 of a parity line #4.

167 indicates the parity signal train generated by the parity operation of the Ethernet frame portion 160 interleaved to the lines #1 to #3 as described in FIG. 3C. Like the signal trains 165-1 to 165-3 of the lines #1 to #3, the parity signal train 167 is encapsulated in a form that adds the encapsulation header 200-4 to the leading edge, extends the frame length in the pad data 203-4, if necessary, and adds the FCS portion 201-4 for encapsulation to the last portion. The management information 168-4 inserted into the inter-frame gap of the signal train 166 is also encapsulated by the encapsulation header 200-8 and the FCS portion 201-8 for encapsulation.

Figure 9C:
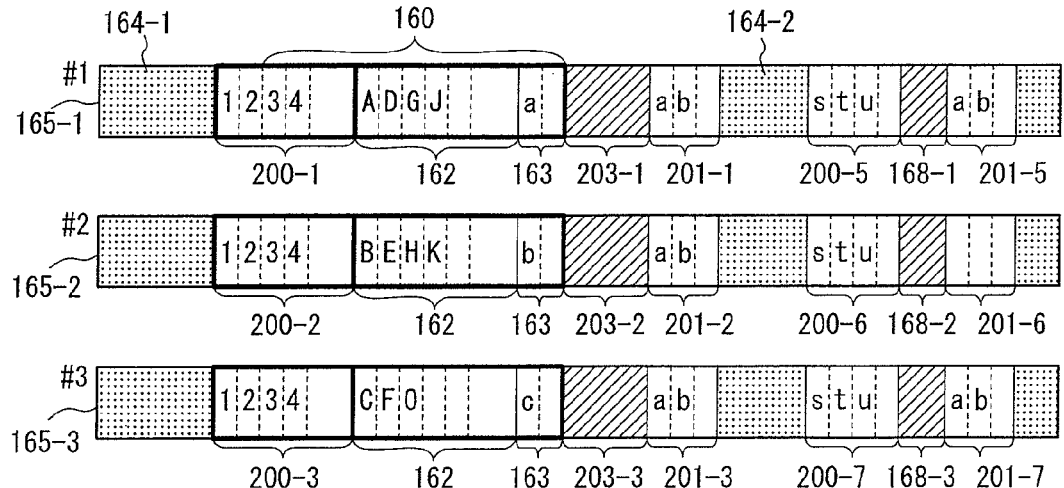
Figure 9D:
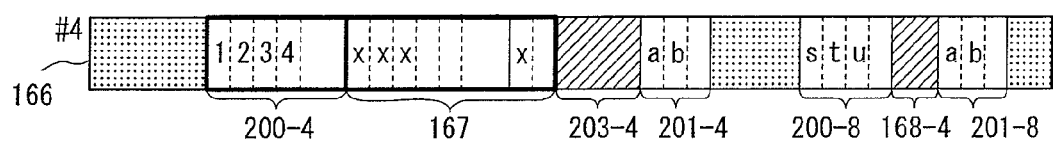

FIGS. 9C and 9D show the signal trains 165-1 to 165-3 and the parity line output signal train 166 when the source header held by each Ethernet frame is applied as the encapsulation headers 200-1 to 200-4.

The headers 200-1 to 200-4 for encapsulation has the same contents as those of the Ethernet header held when each Ethernet frame is output from the first optical interface 104. In the case of the present embodiment, since the Ethernet header does not need to be interleaved to the lines #1 to #3, the interleaved data portion 162 can be arranged just after the headers 200-1 to 200-4 for encapsulation. Therefore, as apparent by comparing with FIG. 9A, the frame length of the Ethernet frame portion 160 can be shortened.

In the present embodiment, the original Ethernet header is needed when performing the encapsulation. Therefore, the interleave processing may be performed, for example, after the speed converter 106 extracts the header portion (Ethernet header) from each Ethernet frame and parallelly outputs (encapsulation processing) it to each line as the encapsulation header, on the data portion 162 and the FCS portion 163 being the remaining portion of each Ethernet frame. A configuration may be usable, in which the speed converter 106 distributes the Ethernet header to each high level framer 108-*i* over the separate line and the high level framer 108-*i* adds the Ethernet header before the frame portion including the interleaved data portion 162 and the FCS portion 163.

In the case of the present embodiment, the opposite apparatus can recover the original Ethernet frame by combining the encapsulation header 200-*i* extracted from the receive signal train as the Ethernet header and the interleave data portion 162 and the FCS portion 163 extracted from the Ethernet frame payload of each line.

Second Embodiment

Figure 10:
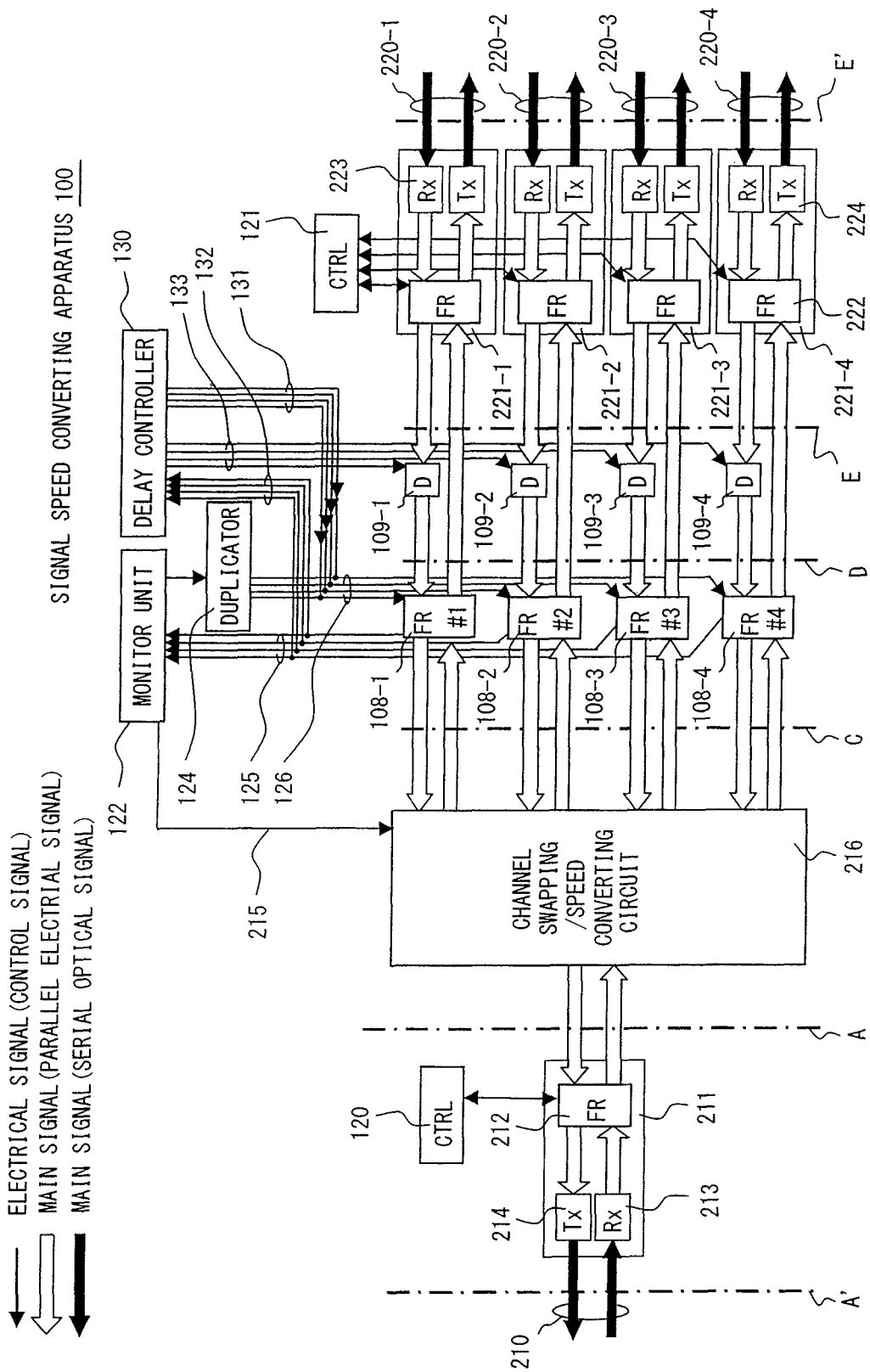
FIG. 10 is a configuration view of a signal speed converting apparatus according to the second embodiment of the present invention.

FIG. 10 shows the second embodiment of the signal speed converting apparatus 100 of the present invention. In the present embodiment, a first optical interface 211 is connected to a serial 40 Giga SONET (or SDH) line 210 and a second optical interface 221-*i* (i=1 to 4) is connected to a 10 Giga SONET line 220-*i* (i=1 to 4). The first optical interface 211 (40 Giga SONET optical interface) includes a first framer circuit 212, a 40 Giga optical receiver 213, and a 40 Giga optical transmitter 214, the first framer circuit 212 being connected to the first control unit 120. The first control unit 120 is connected to the monitor unit 122 by a control line (not shown), as in FIG. 1.

216 is a converting circuit adding a channel swapping function to the speed converter 106 shown in FIG. 1. Herein, although all the parallel line between the converting circuit 216 and the high level framers 108-1 to 108-4 are used as data signal lines, if necessary, the converting circuit 216 may be added with the function of the parity calculator 107 shown in FIG. 1 so that one parallel line can be used as the parity signal line.

The transmission signal processing by the signal speed converting apparatus 100 of FIG. 10 will be described with reference to FIGS. 11A to 11E.

Figure 11A:
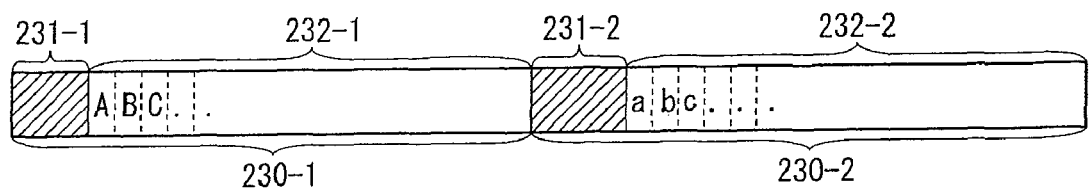
FIG. 11A to 11E are explanation views of a transmission signal processing in the signal speed converting apparatus of the second embodiment.

FIG. 11A shows an input signal from the 40 Giga optical receiver 213 of the first optical interface 211 observed at a point "A" of FIG. 10. The 40 Giga optical receiver 213 is input with frames 230-*i* (i=1, 2, . . . ) of the 40 Giga SONET optical signals each configured of an overhead 231-*i* and a payload 232-*i*.

Figure 11B:
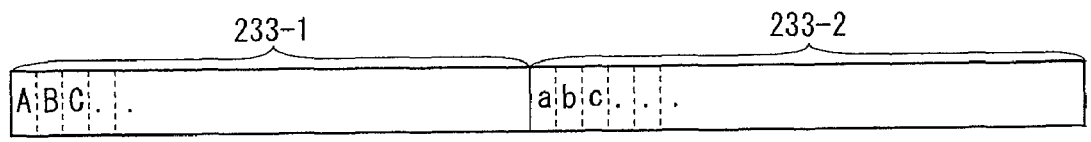

The first optical interface 211 converts input light received in the 40 Giga optical receiver 213 into electrical signals and then performs a decoding processing on the received frame and a removal processing on the overhead 231 by the first framer circuit 212 (40 Giga SONET framer) to output the payload portion 232-*i* as parallel signals as shown in FIG. 11B. The transmission speed of the frames, such as the SONET/SDH, gradually varies during the processing, such as the aforementioned header removal, etc.

Figure 11C:
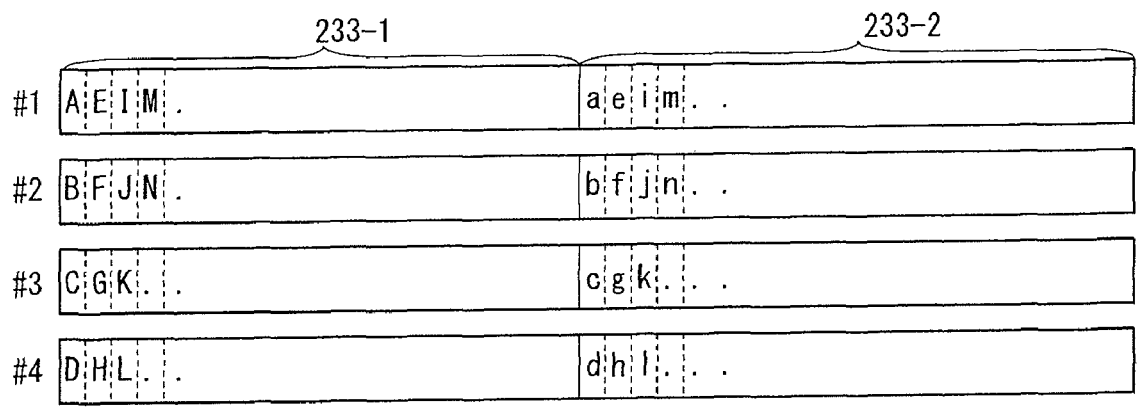

The output signals of the first framer circuit are input to the high level framers 108-1 to 108-4 (third framer circuits) as the signal trains 233-i (i=1, 2, . . . ) interleaved to parallel four lines by the converting circuit 216, as shown in FIG. 11C. At this time, the signal speed of each line is reduced to the ¼ of the signal speed input to the converting circuit 216.

Figure 11D:
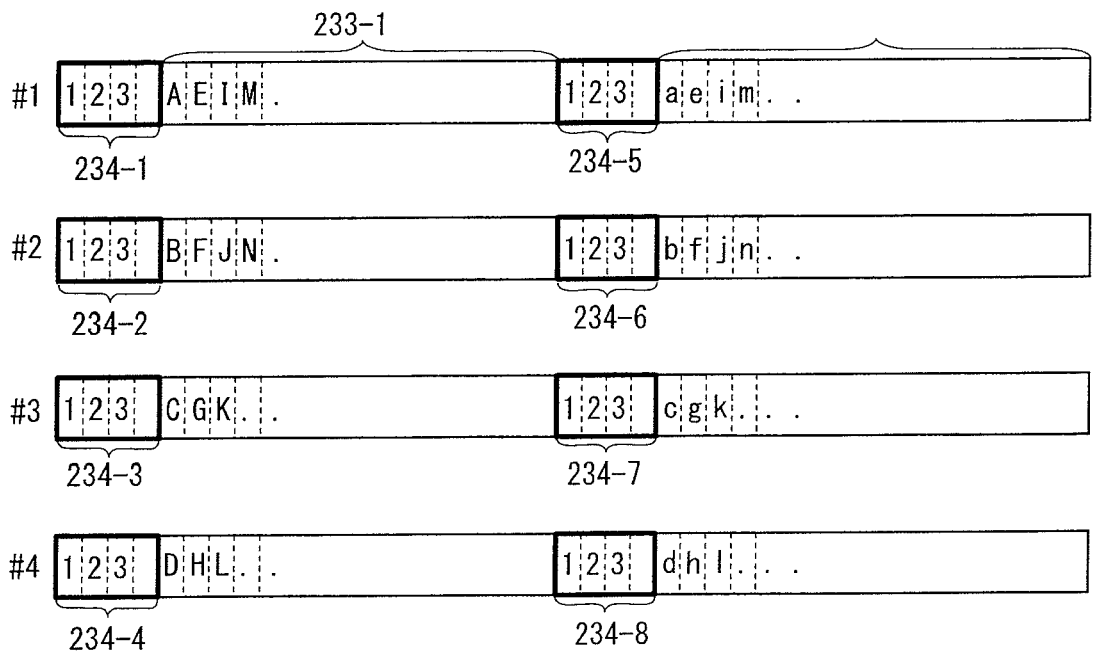

The high level framers 108-1 to 108-4 provides overheads 234 (234-1 to 234-8) for management information to the interleaved signal trains 233-i by the converting circuit 216 as shown in FIG. 11D. The management information, which is not interleaved to plurality of lines, is separately setup in each overhead 234. In this case, the management information is also configured of the plurality of information items shown in FIG. 5.

A format of the overhead 234 carrying the management information can be optionally selected. However, considering a relay processing of the received frames by the SONET transmission apparatus positioned between the signal speed converting apparatus 100 and the opposite apparatus 140, it is exemplary to adopt a high level LOH (line overhead) type or a POH (pass overhead) type in the overhead 234 for the management information, like the general SONET line. The pass or line may be setup between the signal speed converting apparatus 100 and the opposite apparatus 140, like the general SONET line.

Figure 11E:
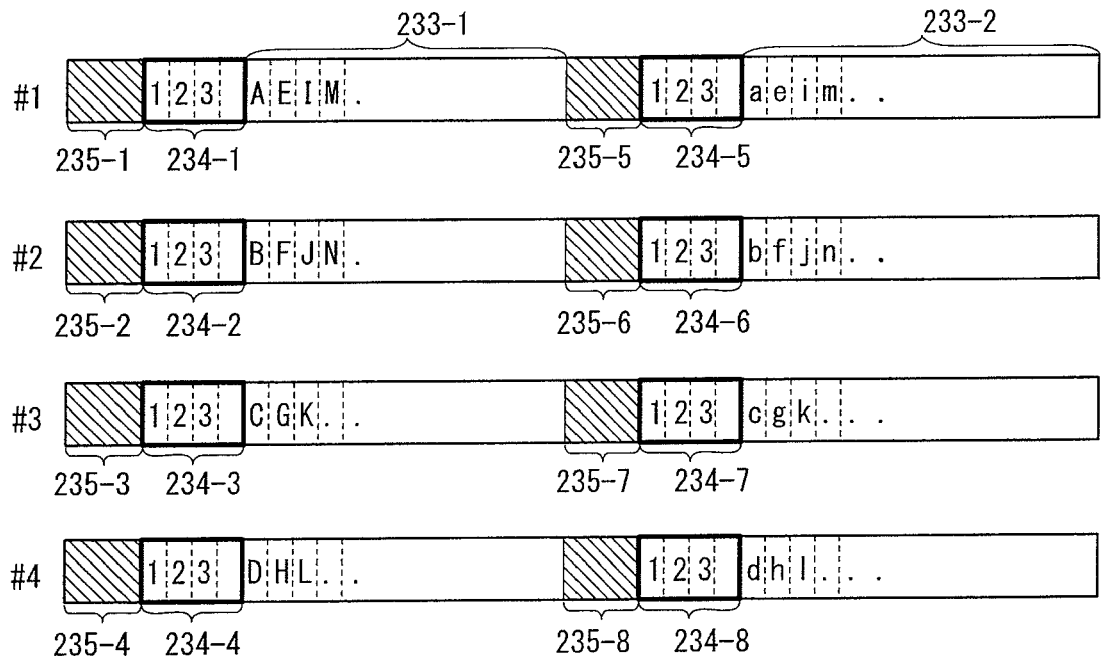

The signal trains output from the high level framers 108-1 to 108-4 are input to the second optical interfaces 221-1 to 221-4 (10 Giga SONET optical interface), respectively, and are provided with the 10 Giga SONET overheads 235 (235-1 to 235-8) before the overhead 234 by the third framer circuit 222 (10 Giga SONET framer), as shown in FIG. 11E. The signals provided with the 10 Giga SONET overheads 235 are converted into the optical signals in the 10 Giga optical transmitter 224, which are in turn sent out to the external optical paths 220 (220-1 to 220-4).

Hereinafter, the processing of the receive signals from the external optical paths 220 (220-1 to 220-4) in the opposite apparatus will be described with reference to FIG. 10 and FIGS. 12A to 12F.

Figure 12A:
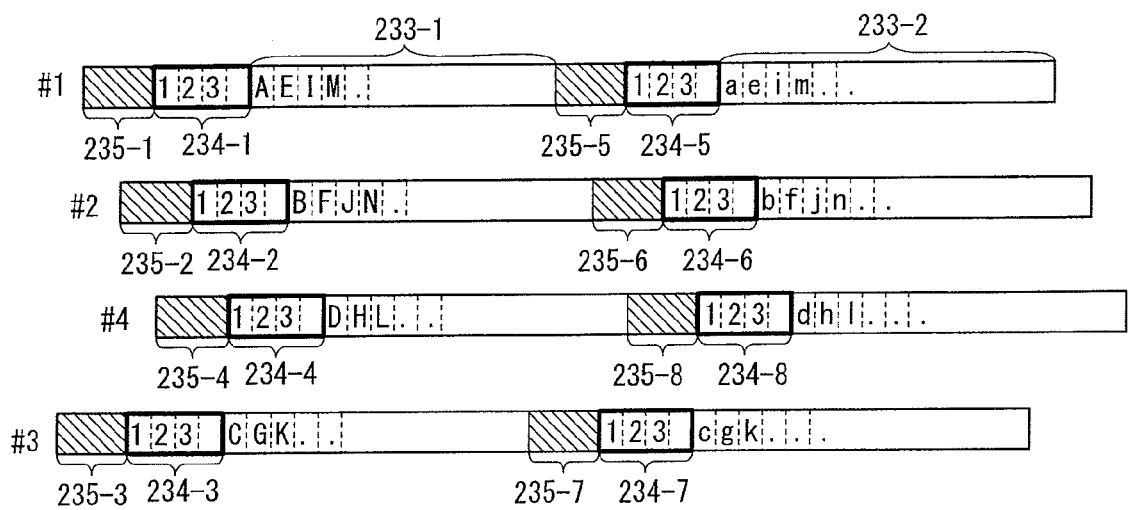
FIGS. 12A to 12F are explanation views of a receive signal processing in the signal speed converting apparatus of the second embodiment.

When the optical signal trains shown in FIG. 11E passes through the WDM transmission end office and the WDM optical path, etc. connected to the external optical path 220, as shown in FIG. 12A, a case where they reach the second optical interfaces 221-1 to 221-4 in a swapped status of the signal train of the line #3 and the signal train of the line #4 by any factors (for example, line connection miss, etc.) can be considered.

Figure 12B:
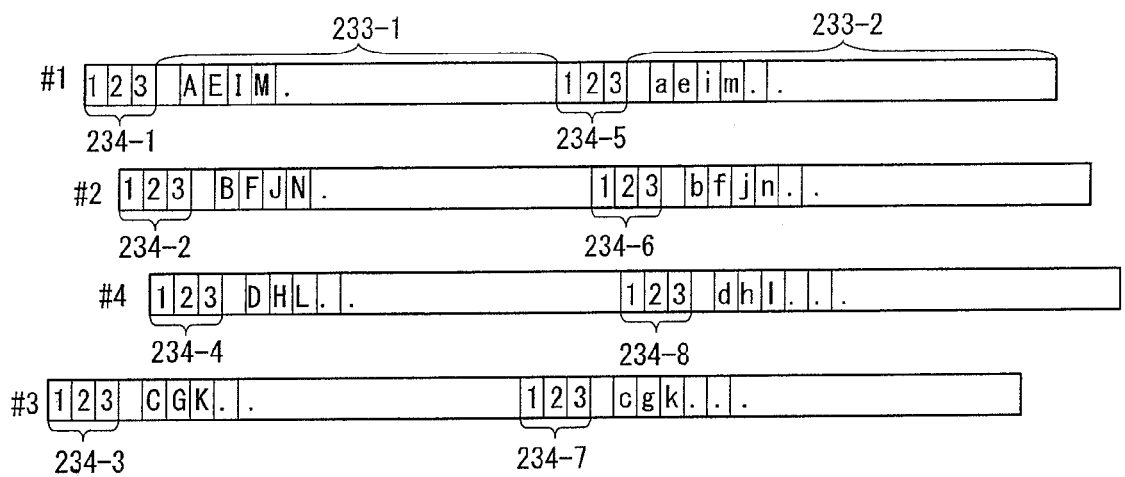
Figure 12C:
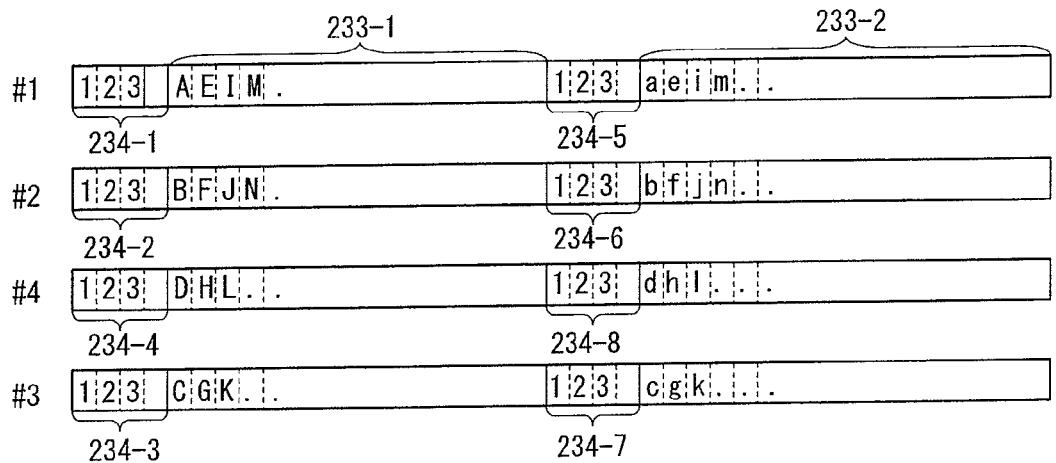
Figure 12D:
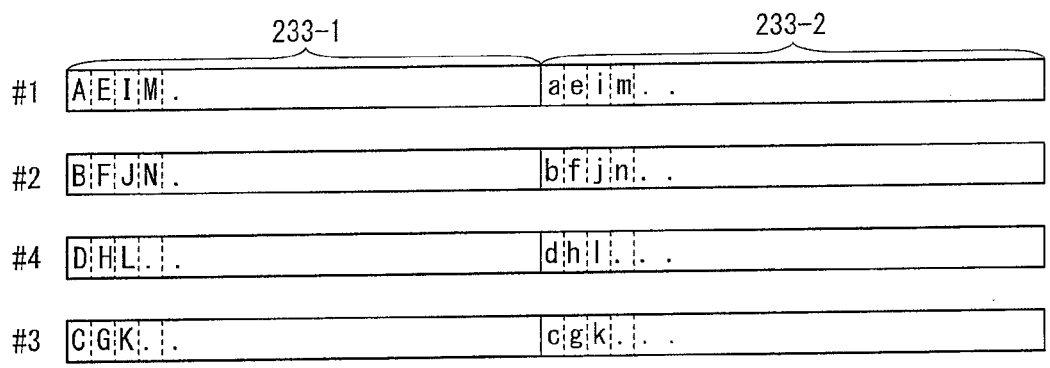

The optical signals shown in FIG. 12a input from the Giga SONET lines 220-i (i=1 to 4) to the second optical interfaces 221-i are converted to electrical signals in the 10 Giga optical receivers 223-i and are then input to the second framer 222, which performs the processes such as the decoding and the removal of the 10 Giga SONET overhead, etc., such that they are converted to the signal train shown in FIG. 12B. The output signal trains of the second optical interfaces 221-i are input to the delay buffer circuits 109-i to remove the delay time difference between the signal train likewise the first embodiment, such that they are converted into the signal trains whose timings are met, as shown in FIG. 12C.

The timing adjusted signal trains in the delay buffer circuits 109-i are input to the high level framer 108-i (i=1 to 4) to extract the management information. The unnecessary overheads 234-i for management information are removed and the receive signal trains are converted into the signal trains shown in FIG. 12D. The management information extracted from the receive signal trains is informed to the monitor unit 122 via the signal line 125.

The monitor unit 122 receives the receive management information 125 transmitted from each high level framer. The monitor unit selects one item of correct management information and at the same time, checks the correspondence relation of each signal train and the receive lines from the line number 171 written in each management information and identification numbers (or identification numbers of signal lines 125) of the high level framers 108-i being the transmission sources of the management information. If the swapping of the signal trains is needed, the monitor unit outputs the channel swapping signal 215 to the converting circuit 216. In the case of the signal trains shown in FIG. 12D, the monitor unit 122 commands the converting circuit 216 to swap the signal train of the line #4 and the signal train of the line #3 by the channel swapping signal 215.

The converting circuit 216 can recognize the position relations of the signal trains received from the high level framers 108-1 to 108-4 according to the channel swapping signal 215. In the case of the present embodiment, the converting circuit 216 performs deinterleave processing, in order of #1, #2, #4, and #3, on the signal trains parallelly input in the position relations of #1, #2, #3, and #4 to convert them into the serial signals shown in FIG. 12E. The swapping of the channel can be realized, for example, by reading out the data in order according to the channel swapping signal 215 from the plurality of buffer memories prepared per line for temporarily storing the receive signal trains.

Figure 12E:
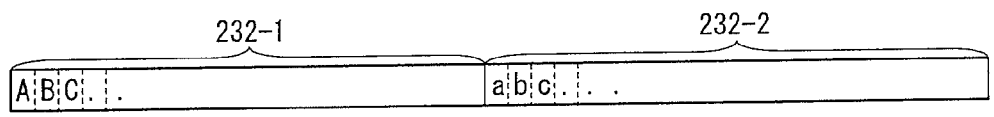
Figure 12F:
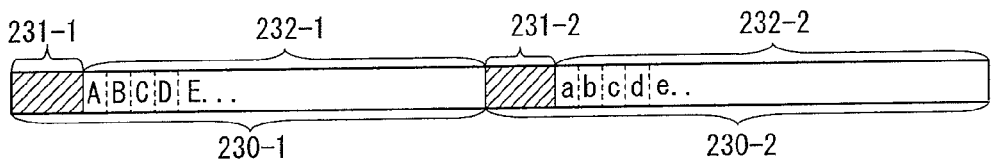

The payload 232 recovered to the serial signal is input to the first optical interface 211 (40 Giga SONET optical interface) and is subjected to the encoding processing and the offer of the overhead 231 by the first framer circuit 212 (40 Giga SONET framer) as shown in FIG. 12E, and is then converted into the optical signal in the optical transmitter 214, which is in turn output to the 40 Giga Ethernet line 210.

When transmitting the optical signal to the optical path 220 in a format where the header portion includes unused areas like the SONET frame, the management information 168 per line may be transmitted to the opposite apparatus by using the unused areas. In this case, the insertion of the management information into each signal train parallelly transmitted is performed by the second framer circuit 222 included in the second optical interface, instead of the high level framer circuit 108.

To be concrete, the management information is transmitted from the monitor unit 122 to the second control unit 121 and is distributed from the second control unit 121 to the second framer circuit 116 so that the second framer circuit 116 writes the management information in the unused areas of the SONET frame header. In this case, the high level framer circuit 108 can be removed from the configuration of FIG. 10. In the opposite apparatus receiving the frames, each of the second framer circuits 116 included in the second optical interfaces 221-1 to 221-4 extracts the management information from the receive signals and informs the second control unit 121 of the extracted management information so that the management is transmitted from the second control unit 121 to the monitor unit 122.

If the management information 168 can be transmitted over any lines by separately transmitting the management information 168 to each line, the communication of the management information and the control command between the signal speed converting apparatuses 100 and 140, so that the same effect as the first embodiment can be obtained even when there are lines not capable of normally receiving the management information.

In the present embodiment, although all the input/output signals from the first optical interface and the second optical interface of the signal speed converting apparatus 100 are the SONET signals, the input/output signals of these interfaces are not limited to the SONET signals, but at least one may be signals, such as SDH, OTN, digital rapper, Ethernet WAN-PHY, etc. other than the SONET.

In the signal speed converting apparatus 100 of the present invention, a definition of the management information or a definition of redundancy line for parity depend on the specifications of the second optical interfaces 105 and 221 being the WDM optical path side, but slightly depend on the specifications of the first optical interfaces 104 and 211.

Therefore, the present invention can be applied to the system configuration connected to the line that transmits the data in the asynchronous frame (packet) type having the undefined period, such as the Ethernet LAN-PHY line or the ATM line. In this case, the data in the asynchronous frame type may be once wrapped in the frame in the SONET type, such as the Ethernet WAN-PHY. Also, the asynchronous data may be mechanically framed and transmitted, including the idle area.

On the contrary, since the second optical interface is an asynchronous type of interface such as the Ethernet LAN-PHY, the present invention can be applied by properly dividing the receive signals from the first optical interface and adjusting the timing even in the case of the synchronous type of interface such as the SONET interface. In this case, a necessary technology is equivalent to a packet transmission technology of synchronous signals used in a voice over IP (VoIP) and therefore, the detailed description thereof will be omitted herein.

Third Embodiment

Figure 13:
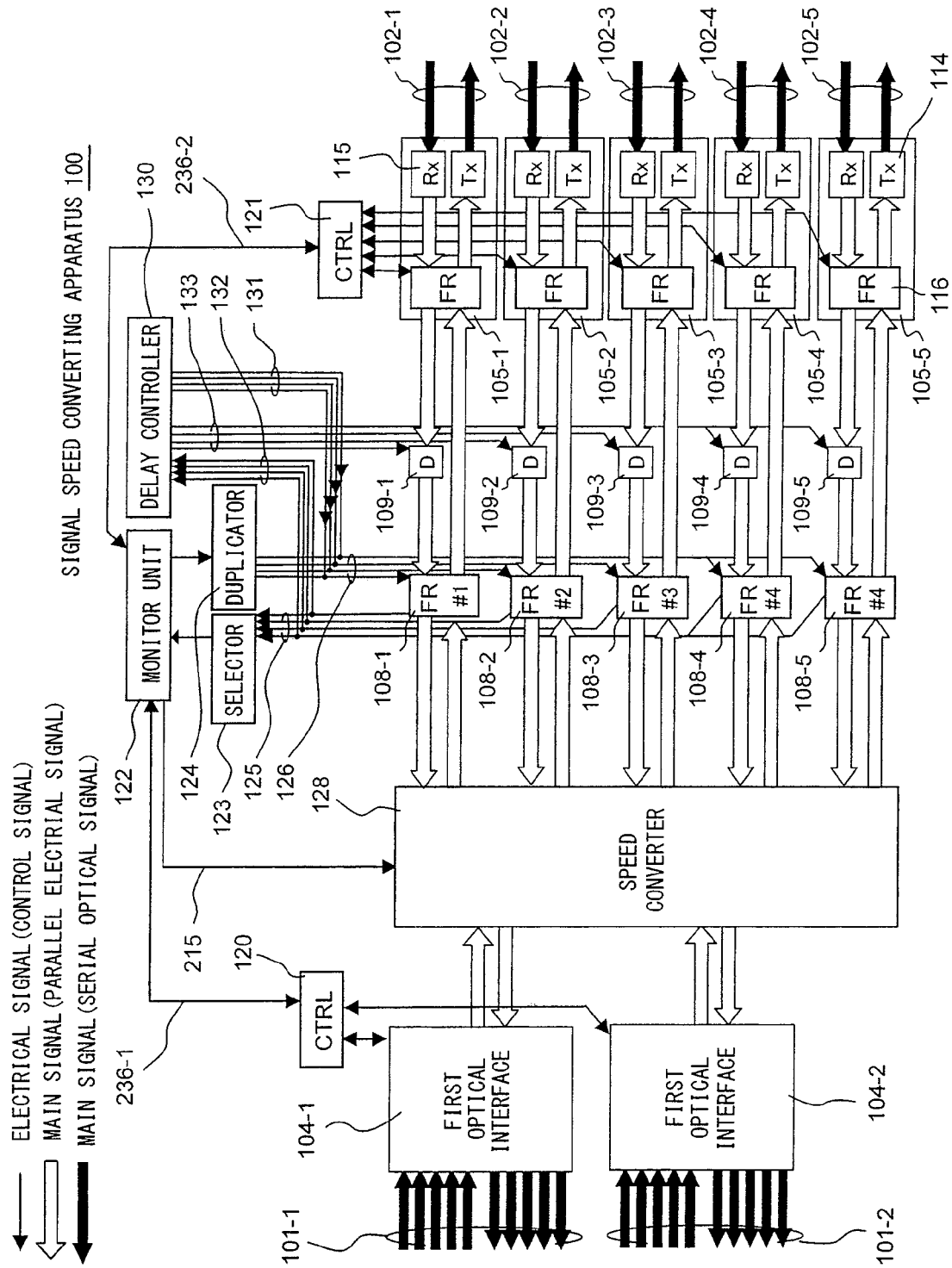
FIG. 13 is a configuration view of a signal speed converting apparatus according to the third embodiment of the present invention.

FIG. 13 shows the third embodiment of the signal speed converting apparatus of the present invention.

The third embodiment includes two groups of the 100 Giga Ethernet interfaces 104-1 and 104-2 as the first optical interface and five groups of the interfaces 105-1 to 105-5 connected to the 40 Giga Ethernet lines 102-1 to 102-5 as the second optical interface. In the present embodiment, a total transmission speed of the first optical interface side and a total transmission speed of the second optical interface side each is 200 Gbps, making it possible to parallelly transmit large-capacity data.

The configuration of the signal processing system connected between the first and second optical interfaces is basically same as the first embodiment. The configuration interleaves the transmission signal trains of 100 Gbps×2 input from the first optical interfaces 104-1 and 104-2 to 40 Gbps×5 lines by the speed converter 128 and deinterleaves the receive signal trains of 40 Gbps×5 input from the second optical interfaces 105-1 to 105-5 to distribute them into the first optical interfaces 104-1 and 104-2.

The speed converter 128 alternately selects, for example, a first signal train of 100 Gbps input from the first optical interface 104-1 and a second signal train of 100 Gbps input from the second optical interface 104-2 to cyclically distribute (interleave) it into five parallel transmission lines in a byte unit.

The sequence of the interleaves can be realized by performing the interleave processing on each of two interface data items in consideration of the whole to be a 200 Giga signal, the two interface data items being alternately parallelly arranged in the buffer memory according to odd numbers and even numbers per an interleave unit, such as byte or bit, etc. In this case, there are problems that the frame interval of the two 100 Giga Ethernet signals does not coincide and it is difficult to load the monitoring information in the high level frame 108, etc. These problems can be solved, for example, by a method that accesses only odd number bytes (or bit) corresponding to the 100 Giga Ethernet interface 104-1 in the high level framer and writes the management information in the idle portion thereof, etc.

Even when the number of lines of the first interface is increased to three and four, the problems can be solved by a method that performs an access per 3 bytes and 4 bytes. It may be allowed to conform two frame lengths each other by making the end portion of the frame having a short length the parity area. Even when the first optical interfaces are three or more, the transmission signal train can be interleaved by the same methods.

In FIG. 13, the first control unit 120 has a configuration that detects the frame headers from the signal trains received in the first optical interfaces 104-1 and 104-2, extracts some of the header information, transmits the extracted information to the monitor unit 122 via a control signal line 236-1, and transmits it to the opposite apparatus (signal speed converting apparatus 140). In other words, the monitor unit 122 writes the header information extracted from the first control unit 120 in the management information 168 and supplies it to the high level framers 108-1 to 108-5 via the duplicator 124 and the signal line 126. Each of the high level framers inserts the management information 168 into the transmission signal trains per line. In the opposite apparatus, each of the second framer circuits 116 of the second optical interface detects the management information from the receive signal train and extracts the header information written in the transmitting side to transmit it to the controller 120.

Among the header information included in the frame header, for example, a MAC address, an Ethernet address, auto protection (APS) information used in the SONET line or the Ethernet WAN-PHY, etc. become a transmission object. As such, the WDM optical network between the signal speed converting apparatuses is virtually transparent by transmitting some of the header information along with the management information from the transmitting-side signal speed converting apparatus 100 to the receiving-side signal speed converting apparatus 140, making it possible to smoothly perform an auto switching or a mutual recognition in information communication devices such as the router communicated via the WDM network.

Figure 14:
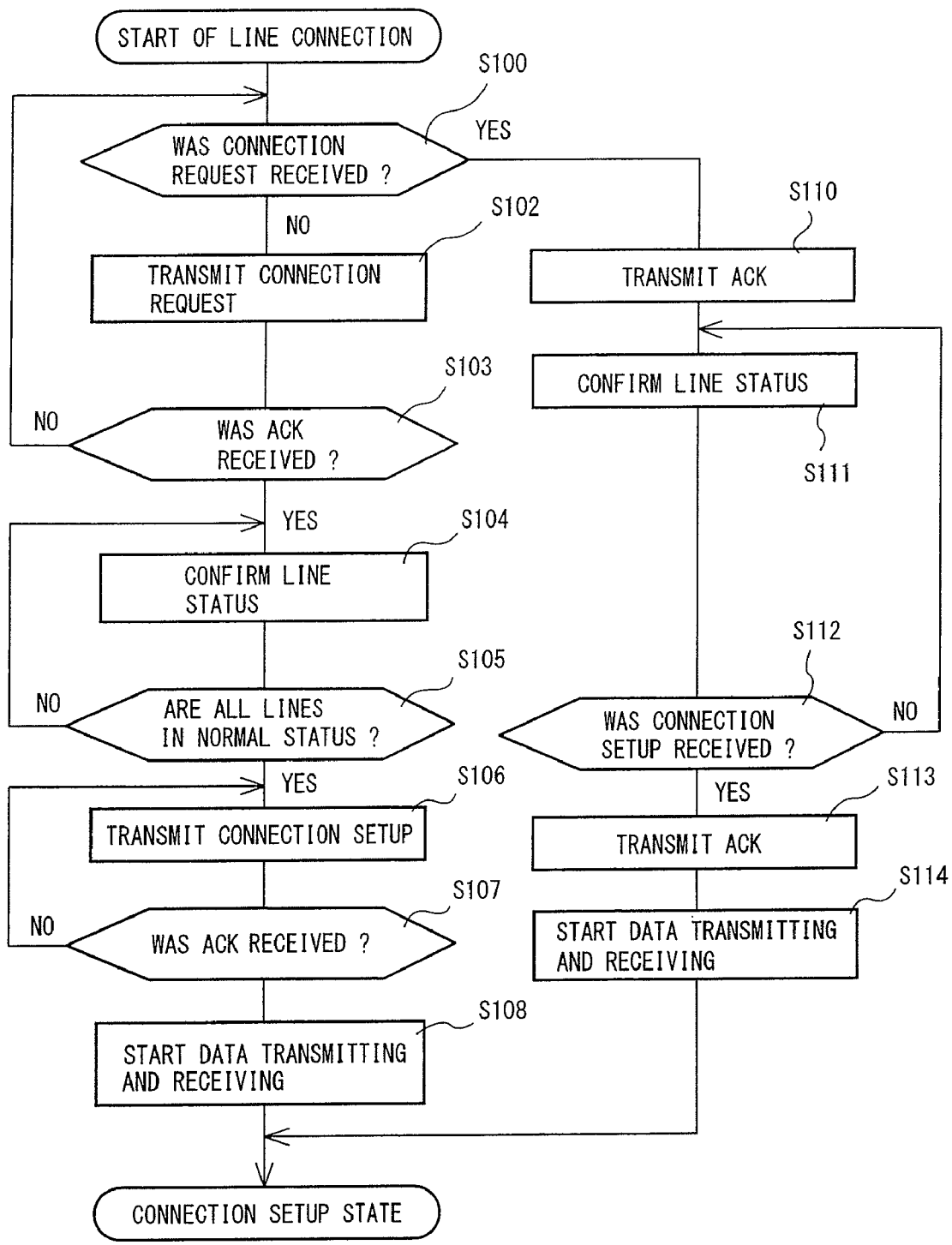
FIG. 14 is a flow chart showing one example of a line connection procedure performed by the signal speed converting apparatus of the present invention in association with an opposite apparatus.

FIG. 14 is a flow chart showing one example of a connection procedure performed between the signal speed converting apparatus 100 of the present invention and the opposite apparatus 140 by using the management information When the signal speed converting apparatus 100 (monitor unit 122) of the present invention performs a power supply starting operation or a reset operation, it becomes a master of the connection procedure to send out a connection request to the opposite apparatus (signal speed converting apparatus 140) being the other party of connection (S100). The connection request is setup in the management information 168 of the control command/response 175 to be transmitted to the opposite apparatus. The signal speed converting apparatus 100 waits for the receive of ACK from the opposite apparatus (S103) and if it receives ACK from the opposite apparatus, the acknowledgement of the line status to each other starts (S104). In the acknowledgement of the line status, for example, a status of the connection line of the first optical interface 104 collected from the first control unit 120, a status of the connection line of the second optical interfaces 105-1 to 105-4 collected from the second control unit 121, and a status of the receive line of the opposite apparatus side based on the management information received from the opposite apparatus are acknowledged.

The signal speed converting apparatus 100 waits for a normal connection state of the whole line (S105). If the whole line is acknowledged to be in the normal connection status, the signal speed converting apparatus 100 (monitor unit 122) transmits "connection setup" to the opposite apparatus (S106) and waits for the receive of ACK from the opposite apparatus (S107) If the signal speed converting apparatus 100 receives ACK regarding the connection setup state from the opposite apparatus, it starts to transmit and receive data (S108).

If the signal speed converting apparatus 100 receives the connection request from the opposite apparatus side just after the power supply starting/the reset (S100), it becomes a slave of the connection procedure to transmit ACK to the opposite apparatus (S110), perform the response operation for the line status acknowledgement according to the command from the opposite apparatus (S111), and waits for the receive of the connection acknowledgement from the opposite apparatus (S112). If the signal speed converting apparatus 100 receives the connection acknowledgement from the opposite apparatus, it returns ACK (S113) and starts to transmit and receive the data (S114).

If the signal speed converting apparatus 100 detects the failure of the connection line in the data transmitting and receiving status, it uses the management information to inform the opposite apparatus of the failure status. For example, when failure exceeding a correctable range by the parity occurs, it asks the opposite apparatus to stop the data transmission and reception, and reperforms the connection procedure starting from the line connection request transmission. Thus, even when some of the lines are an interrupted status, the failure situation can be grasped by mutually communicating the line status or the apparatus status between the signal speed converting apparatuses.

Fourth Embodiment

Figure 15:
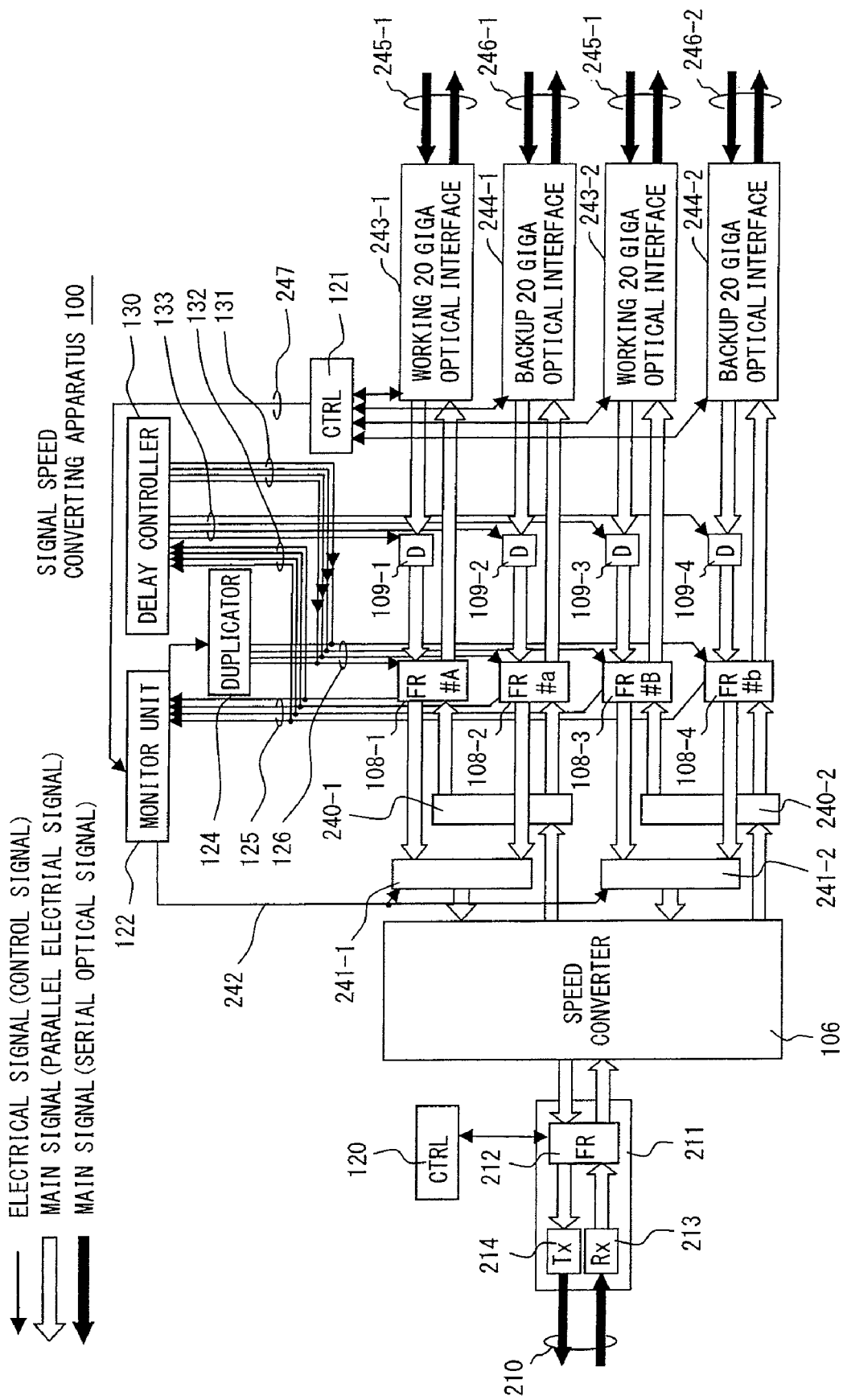
FIG. 15 is a configuration view of a signal speed converting apparatus according to the fourth embodiment of the present invention.

FIG. 15 shows a configuration example of signal speed converting apparatus mounting a 1+1 type of an optical protection function as the fourth embodiment of the present invention.

In the signal speed converting apparatus 100 of the present invention, the second optical interface includes two 20 Giga optical interfaces 243-1 and 243-2 for working use and two 20 Giga optical interfaces 244-1 and 244-2 for backup. The working optical interface 243-1 and the backup optical interface 244-1 make a pair, and the working optical interface 243-2 and the backup optical interface 244-2 make a pair.

The 1+1 optical protection, which transmits the same signals from the working optical interface and the backup optical interface forming a pair each other, is capable of performing a switching to the backup when the failure in the working line occurs. The optical protection can also be applied to the first optical interface side, however, it is generally applied to the second optical interface side connected to the WDM line of the trunk line side having a long transmission path and many apparatuses on the path thereof.

In the present embodiment, each of the signal trains of 20 Gbps output to the first and second output lines connected to the speed converter 106 is input to the first duplicator 240-1 and the second duplicator 240-2 to branch the input signal trains into two in each duplicator, wherein the output signal from the first duplicator 240-1 is input to the high level framers 108-1 and 108-2 and the output signal from the second duplicator 240-2 is input to the high level framer 108-3 and 108-4.

The same optical signals can always be transmitted from the working and backup optical interfaces 243-1 and 244-1 and 243-2 and 244-2 forming a pair to the optical lines 245-1 and 246-1 and 245-2 and 246-2 by inputting the output signals from the high level framers 108-1 and 108-2 to the working optical interface 243-1 and the backup optical interface 244-1 and inputting the output signals from the high level framers 108-3 and 108-4 to the working optical interface 243-2 and the backup optical interface 244-2.

These transmission signals are transmitted to the WDM network via the WDM transmission end office 141-1 and are input to the second optical interface of the opposite apparatus (signal speed converting apparatus 140) via the WDM transmission end office 141-3 on the opposite side. The receive operation of the opposite apparatus will be described with reference to FIG. 15.

The signal trains received in the working optical interface 243-1 and the backup optical interface 244-1 are input to the first selector 241-1 via the delay buffers 109-1 and 109-2 and the high level framers 108-1 and 108-2 (third framer circuits), and the first selector 241-1 selects any receive signals to be input to the speed converter 106. Likewise, the signal trains received in the working optical interface 243-2 and the backup optical interface 244-2 are input to the second selector 241-2 via the delay buffers 109-3 and 109-4 and the high level framers 108-3 and 108-4 (third framer circuits), and the second selector 241-2 selects any receive signals to be input to the speed converter 106.

The monitor unit 122 generates the select signals based on the line status information of the working and backup input from the second control unit connected to two pairs of the second optical interfaces via the control signal line 247, the line status information input from the high level framers 108-1 to 108-4 via the control signal line 125, or the control command and supplies them to the first and second selectors 241-1 and 241-2 via the control signal line 242. The monitor unit 122 generates the select signal to select the receive signal of the working optical interface and when the failure in any optical interface of the working occurs, switches the select signals to select the receive signal of the backup optical interface.

In the embodiment, the whole line of the working and the backup is provided with the high level framer 108 and the delay buffer circuit 109; however, the amount of hardware can be reduced to ½ by commonly using these circuit components in the working circuit and the backup circuit. However, as in the present embodiment, with these circuit components mounted separately on the whole line as well as the delay time difference between the working lines and between the backup lines always adjusted to be zero, the readjustment of the delay of the backup lines after the switching is not needed and therefore, it is possible to directly perform the switching to the backup line.

Also, in the configuration, if the adjustment is performed to completely meet the delays of the working and backup four lines, it is possible to perform uninterruptible switching. In other words, when the deterioration of signal occurs and the replace of apparatus parts is performed, etc., it is possible to switching the signals of the working and the backup without causing the signal interruption.

Also, FIG. 15 shows the signal speed converting apparatus including the 1+1 type of the protection function, however, the present embodiment can also be applied to other types of optical protections, such as a 1:N type, a ring type, etc. Also, in the embodiment, the four second optical interfaces 243-1 to 244-2 are fixedly used as the interfaces for two pairs of the optical protection configured of the working and the backup; however, since the duplicator 240 or the selector 241 can be implemented by a simple logic operation circuit, for example, various kinds of these circuit components are installed as a combination of software built in an FPGA, and the usage of the second optical interface may dynamically be changed.

For example, when eight second optical interfaces are prepared and two groups of four are formed, the two pairs may be used as independent working lines; four as the working and the remaining four as the backup may be used for four pairs of the 1+1 type of optical protection; four optical interfaces may be allocated respectively to the working and the backup; and only four optical interfaces may be installed. Also, if necessary, any number of parity lines can be installed.

What is claimed is:

1. A signal speed converting apparatus comprising:
a first optical interface, connected to a first optical line group including at least one optical line, for transmitting and receiving information frames with a first format as a serial optical signal or a logical group of parallel optical signals;
a plurality of second optical interfaces connected to a second optical line group for transmitting and receiving information frames with a second format as optical signals; and
a speed converting unit located between the first optical interface and the second optical interface,
said first optical interface having a first framer for terminating the information frames in the first format to be transmitted to or received from said first optical line group and converting original information signals in the information frames into a serial signal train or a logical group of parallel signal trains,
wherein said speed converting unit converts the serial signal train or the parallel signal trains input from said first framer into a plurality of signal trains each including interleaved original information signals by cyclically allocating the serial signal train or the parallel signal trains to a plurality of internal lines corresponding to the second optical interfaces, and
wherein each of said second optical interfaces has a second framer for converting the interleaved signal train on one of said internal lines corresponding to the second framer into the information frame in the second format,
the signal speed converting apparatus further comprising a plurality of management information inserting units for duplicating management information to be communicated with an opposite signal speed converting apparatus located at opposite side via external WDM optical paths and inserting the management information into the plurality of signal trains individually, and management information extracting units for extracting management information from signal trains transmitted from the opposite signal speed converting apparatus.

2. The signal speed converting apparatus according to claim 1, further comprising a parity calculator for generating a parity code train with respect to the plurality of interleaved signal trains and outputting the parity code train to one of the plurality of internal lines assigned as an parity line,
wherein one of said management information inserting units and one of said management information extracting units inserts and extracts the management information to be communicated with said opposite signal speed converting apparatus into and from the signal trains on the parity line, respectively,
wherein the second framer in one of said second optical interfaces converts parity signals on the parity line into the information frames in the second format to transmit the transmission signal trains including the information frames to one of optical line of said second optical line group.

3. The signal speed converting apparatus according to claim 1, including a plurality of first optical interfaces as said first optical interface connected to said speed converting unit,
wherein the speed converting unit performs multiplexing of signal trains received from the plurality of first optical interfaces to interleave them to the plurality of internal lines.

4. The signal speed converting apparatus according to claim 1,
wherein said original information signal is a framed information signal, and
wherein said speed converting unit interleaves each framed information signal output from said first framer to said plurality of internal lines in an upward direction so that leading portions of the framed information signals are always sent out from specific ones of the plurality of second optical interfaces.

5. The signal speed converting apparatus according to claim 1,
wherein said original information signal is a framed information signal composed of a header portion, a data portion, and a trailer portion, and
wherein said speed converting unit interleaves said framed information signal to said plurality of internal lines so that each leading edge of the header portion, the data portion, and the trailer portion of the interleaved original information signals occupy positions temporally corresponding to each other in the plurality of signal trains.

6. The signal speed converting apparatus according to claim 1, including a plurality of third framers each of which is located per said internal line between said speed converting unit and one of said second optical interfaces and includes a pair of said management information inserting unit and said management information extracting unit.

7. The signal speed converting apparatus according to claim 6, further comprising a monitor unit connected to said plurality of third framers,
wherein each of the third framers individually inserts information supplied from the monitor unit as said management information into the signal trains on the internal line corresponding thereto.

8. The signal speed converting apparatus according to claim 7,
wherein said original information signal is a framed information signal,
wherein said speed converting unit interleaves the framed information signal so that inter-frame gaps or idle areas are formed in the transmission signal trains on each of said internal lines, and
wherein each of said third framers inserts the management information into the inter-frame gaps or the idle areas in the transmission signal trains on each of the internal lines.

9. The signal speed converting apparatus according to claim 8, wherein each of the third framers adds non-interleaved encapsulation headers to the interleaved communication frame and the management information in the signal trains, thereby to transmit encapsulated signal to said internal line.

10. The signal speed converting apparatus according to claim 7,
wherein said speed converting unit encapsulates each of said interleaved signal trains by adding non-interleaved encapsulation headers to them, and
wherein each of the third framers adds a non-interleaved encapsulation header to said management information, thereby to transmit encapsulate signal to said internal line.

11. The signal speed converting apparatus according to claim 10,
wherein said original information signal is a framed information signal, and
wherein said speed converting unit extracts the header portion from the framed information signals, interleaves the remaining portion to said plurality of internal lines, and adds the header portions of the framed information signal as encapsulation header to the interleaved information signals, thereby to transmit encapsulated signal to said internal line.

12. The signal speed converting apparatus according to claim 7,
wherein said original information signal is a framed information signal,
wherein said speed converting unit extracts the header portion from each of the framed information signals, supplies the header portion to each of said third framers, and interleaves the remaining portion of each of the framed information signals to said plurality of internal lines, and
wherein each of said third framers encapsulates the interleaved information signal included in the transmission signal train by adding the header portion supplied from said speed converting unit as the encapsulation header.

13. The signal speed converting apparatus according to claim 7,
wherein each of said third framers adds a non-interleaved encapsulation header including the management information to the interleaved information signal included in the signal train.

14. The signal speed converting apparatus according to claim 1,
wherein each of said second framers includes said management information inserting unit and inserts the management information into the header portion of information frame in the second format.

15. The signal speed converting apparatus according to claim 14, further comprising a monitor unit connected to said plurality of second framers, and
wherein each of said second framers receives said management information from said monitor unit.

16. The signal speed converting apparatus according to claim 1,
wherein said original information signal is a framed information signal, and
wherein said speed converting unit is provided with said management information inserting unit or said management information extracting unit to insert or extract said management information into or from a part of unused area of a payload portion or unused areas of a header portion of each of the interleaved information signals.

17. The signal speed converting apparatus according to claim 16, further comprising a monitor unit connected to said speed converting unit,
wherein the speed converting unit receives said management information from the monitor unit.

18. The signal speed converting apparatus according to claim 1, wherein said management information includes status information on the signal speed converting apparatus and a control command or a response to be sent to said opposite signal speed converting apparatus.

19. The signal speed converting apparatus according to claim 18, wherein said management information includes said status information on the signal speed converting apparatus and said control command or response to said opposite signal speed converting apparatus as common management information for the plurality of internal lines and includes line identification information as inherent information for each of the internal lines.

20. The signal speed converting apparatus according to claim 1,
wherein each of said management information extracting units extracts management information transmitted by said opposite signal speed converting apparatus from receive signal train that each of said second optical interfaces receives from said second optical line group and outputs to the internal line, and transmits the management information to a monitor unit connected to the management information inserting unit.

21. An optical transmission system including the signal speed converting apparatus according to claim 1,
wherein the signal speed converting apparatus is coupled, via said second optical line group, to a WDM end office connected to one end of said external WDM optical paths, and
wherein the signal speed converting apparatus communicates said management information and said information signals with said opposite signal speed converting apparatus which is coupled, via said second optical line group, to another WDM end office connected to the other end of the WDM optical paths.

22. The optical transmission system according to claim 21, wherein said signal speed converting apparatus is connected, via said first optical line group, to an information device for transmitting and receiving optical signals in a second format suitable for short range transmission.

* * * * *